United States Patent [19]

Smith

[11] Patent Number: 5,090,898
[45] Date of Patent: Feb. 25, 1992

[54] INFRA-RED HEATING

[76] Inventor: Thomas M. Smith, 1415 Golf Rd., Connaminson, N.J. 08077

[21] Appl. No.: 424,762

[22] Filed: Oct. 20, 1989

Related U.S. Application Data

[63] Continuation-in-part of Ser. No. 329,551, Mar. 28, 1989, Pat. No. 5,046,944, and a continuation-in-part of Ser. No. 125,001, Jan. 4, 1988, Pat. No. 4,830,651, and a continuation-in-part of Ser. No. 12,723, Feb. 9, 1987, abandoned, and a continuation-in-part of Ser. No. 771,722, Sep. 3, 1985, Pat. No. 5,024,596, which is a continuation-in-part of Ser. No. 76,674, Jul. 23, 1987, abandoned, which is a continuation-in-part of Ser. No. 831,795, Feb. 19, 1986, Pat. No. 4,722,681, which is a continuation-in-part of Ser. No. 752,908, Jul. 8, 1985, Pat. No. 4,604,054, which is a continuation-in-part of Ser. No. 628,989, Jul. 9, 1984, Pat. No. 4,589,843, which is a continuation-in-part of Ser. No. 592,793, Mar. 23, 1984, Pat. No. 4,654,000, which is a continuation-in-part of Ser. No. 567,270, Dec. 30, 1983, abandoned, which is a continuation-in-part of Ser. No. 509,161, Jun. 29, 1983, Pat. No. 4,500,823, which is a continuation-in-part of Ser. No. 435,412, Oct. 20, 1982, abandoned, which is a continuation-in-part of Ser. No. 312,730, Oct. 19, 1981, Pat. No. 4,443,185, which is a continuation-in-part of Ser. No. 292,167, Aug. 12, 1981, Pat. No. 4,474,552, which is a continuation-in-part of Ser. No. 279,081, Jun. 30, 1981, Pat. No. 4,416,618, which is a continuation-in-part of Ser. No. 238,418, Feb. 26, 1981, Pat. No. 4,447,205, which is a continuation-in-part of Ser. No. 186,491, Sep. 12, 1980, Pat. No. 4,378,207, which is a continuation-in-part of Ser. No. 94,901, Nov. 16, 1979, Pat. No. 4,272,238.

[51] Int. Cl.$^5$ .............. F23D 3/40; F26B 3/32
[52] U.S. Cl. .................. 431/326; 431/328; 34/41; 432/59
[58] Field of Search .......... 431/154, 328, 326, 356, 431/165, 164; 34/41, 18, 60; 432/59

[56] References Cited

U.S. PATENT DOCUMENTS

| | | | |
|---|---|---|---|
| 3,114,410 | 12/1963 | Schneider | 431/328 X |
| 3,439,996 | 4/1969 | Lherault et al. | 431/328 |
| 4,628,900 | 12/1986 | Arndt | 431/328 |
| 4,752,213 | 6/1988 | Grochowski | 431/328 |

Primary Examiner—Henry Bennett
Attorney, Agent, or Firm—Connolly & Hutz

[57] ABSTRACT

Gas-fired burner having porous ceramic face through which gaseous combustion mixture emerges and on the emerging surface of which the mixture burns, can heat substrate with help of streams of air or recycled combusted gas sweeping across substrate to help remove moisture or other volatiles being driven from substrate. Burner body can have pilot ignition compartment. Ceramic face can be large ceramic fiber mat the back of which is supported to burner body back. Combustion mixture can be controlled to essentially stoichiometric. Aligned row of closely spaced burners each with a generally rectangular radiant face extending to its sidewalls, can have strips of compressible material squeezed into place between the burner side-walls to minimize penetration of hot combusted gases. Side-walls may be inclined to provide a wedging action against the compressible strips. Burners may be fed with oxygen-enriched air, or with a little ammonia in addition to the combustion mixture, particularly when the burner matrix contains silicon carbide fibers or powder.

4 Claims, 16 Drawing Sheets

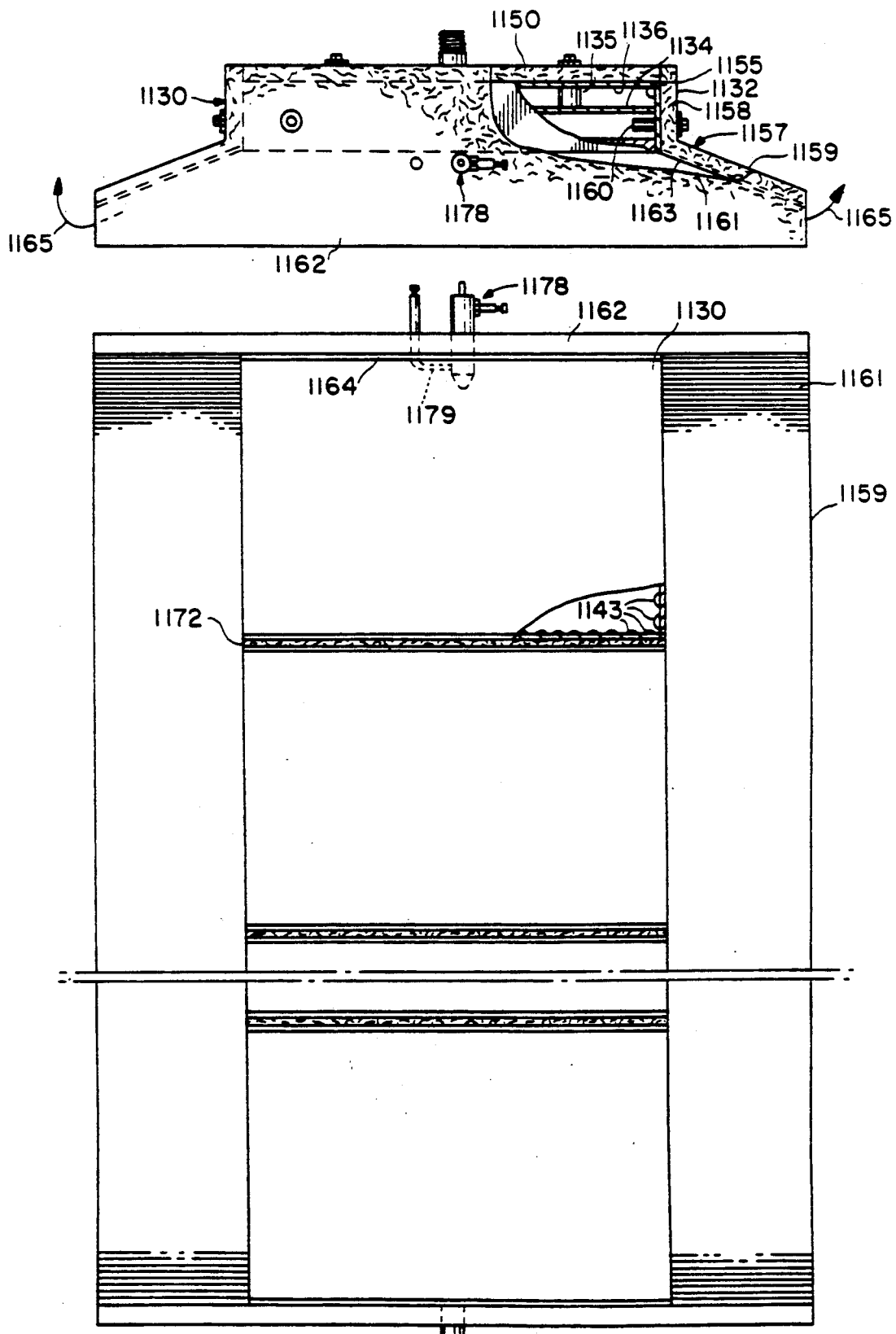

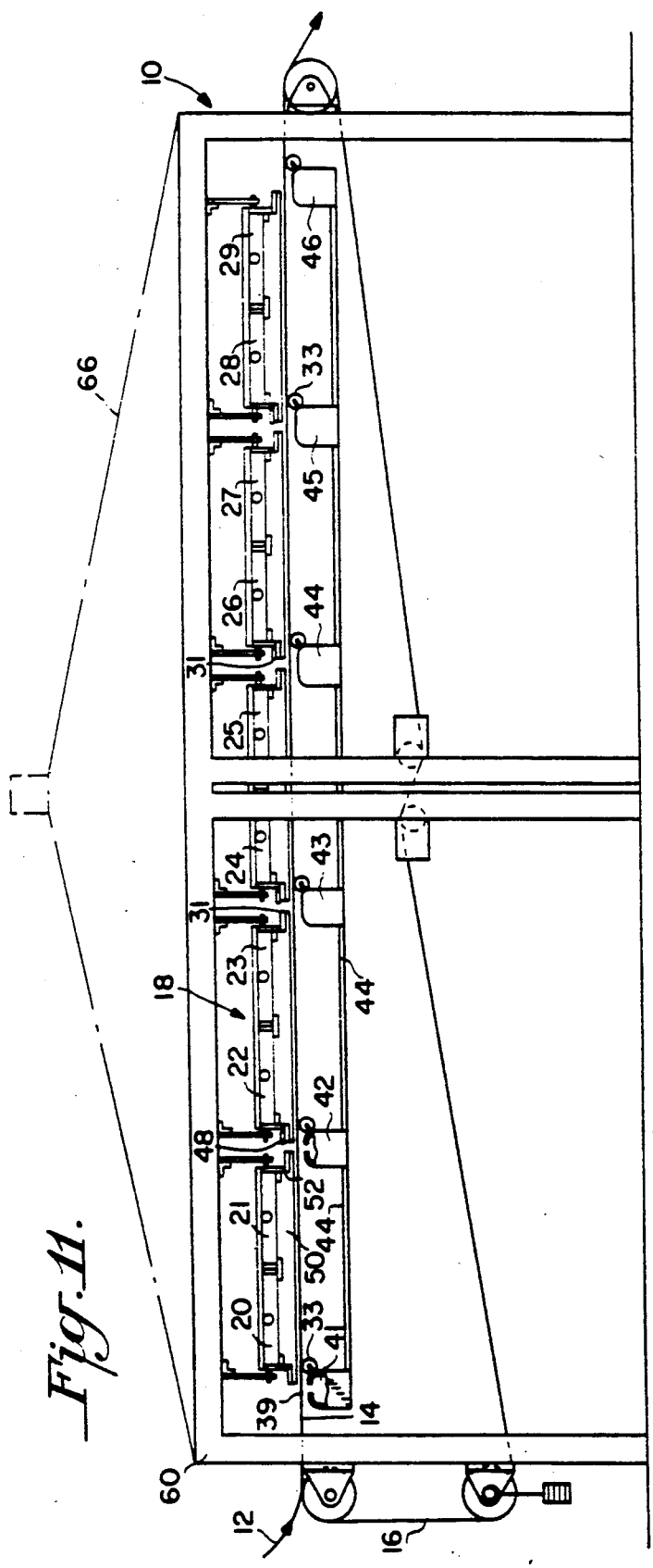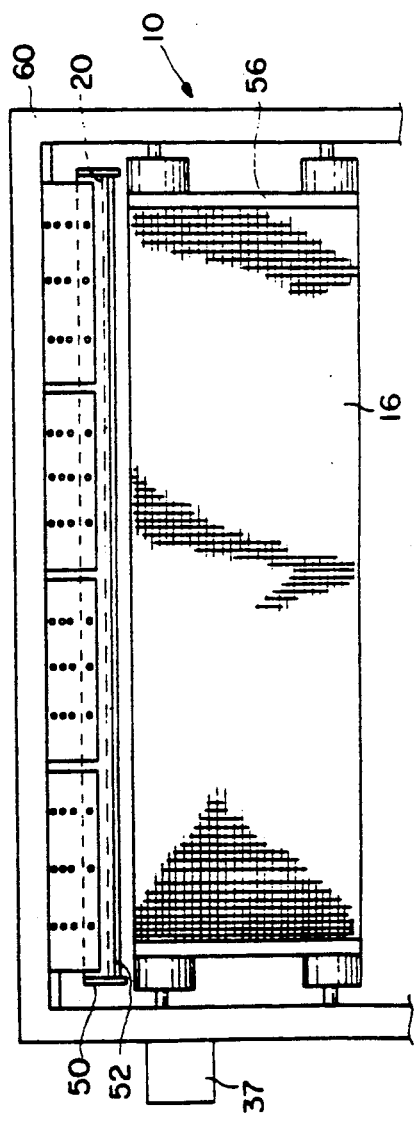

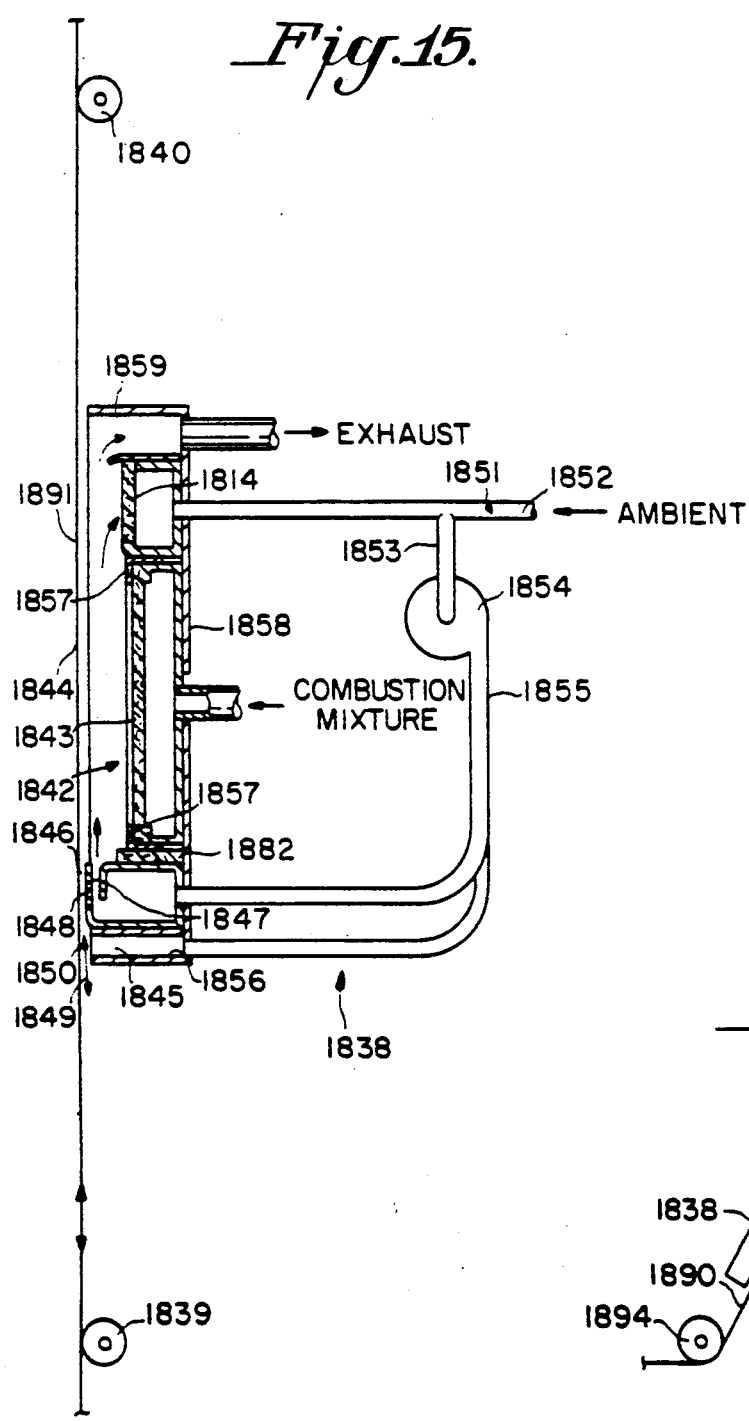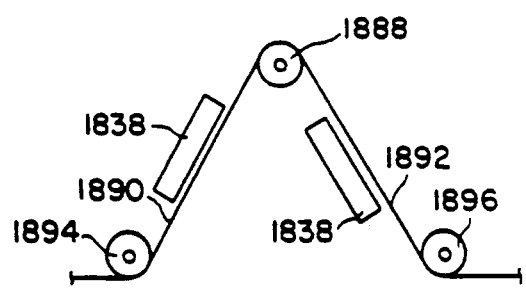

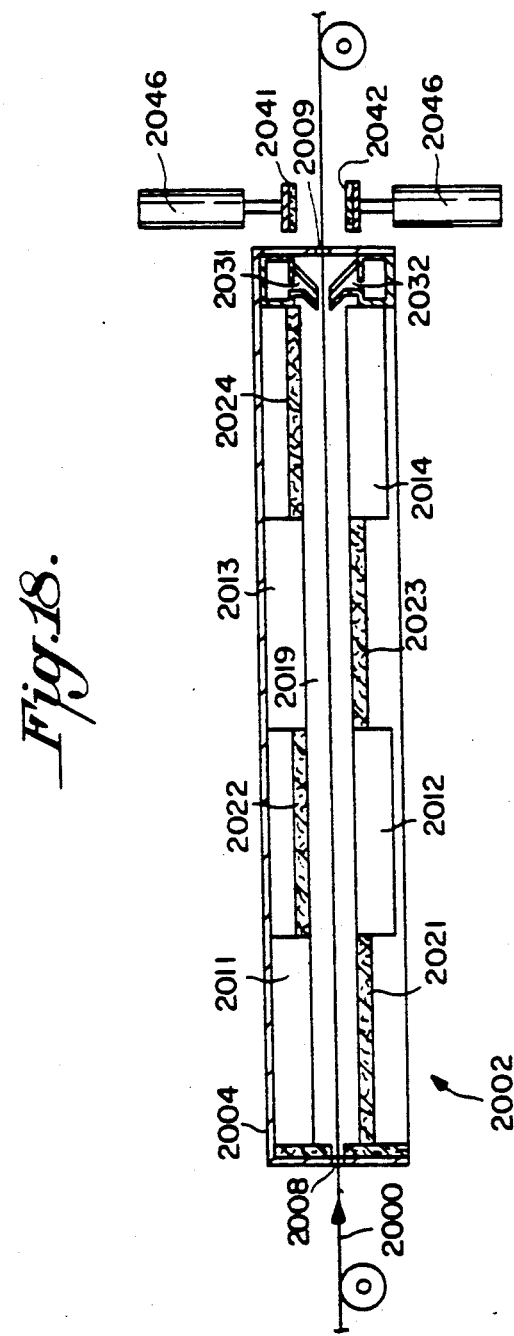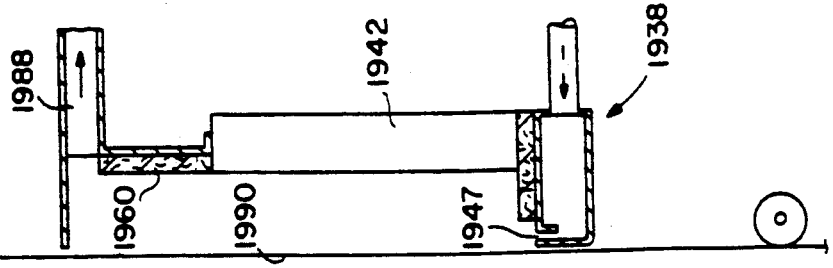

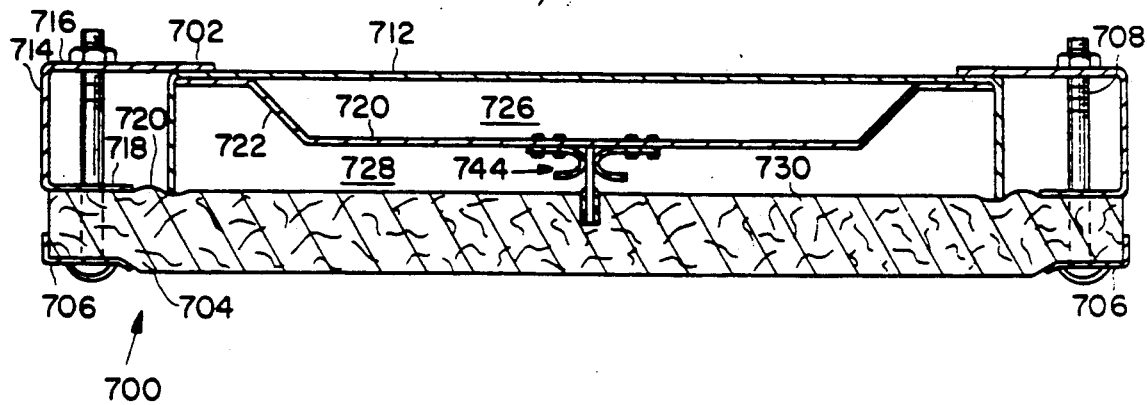

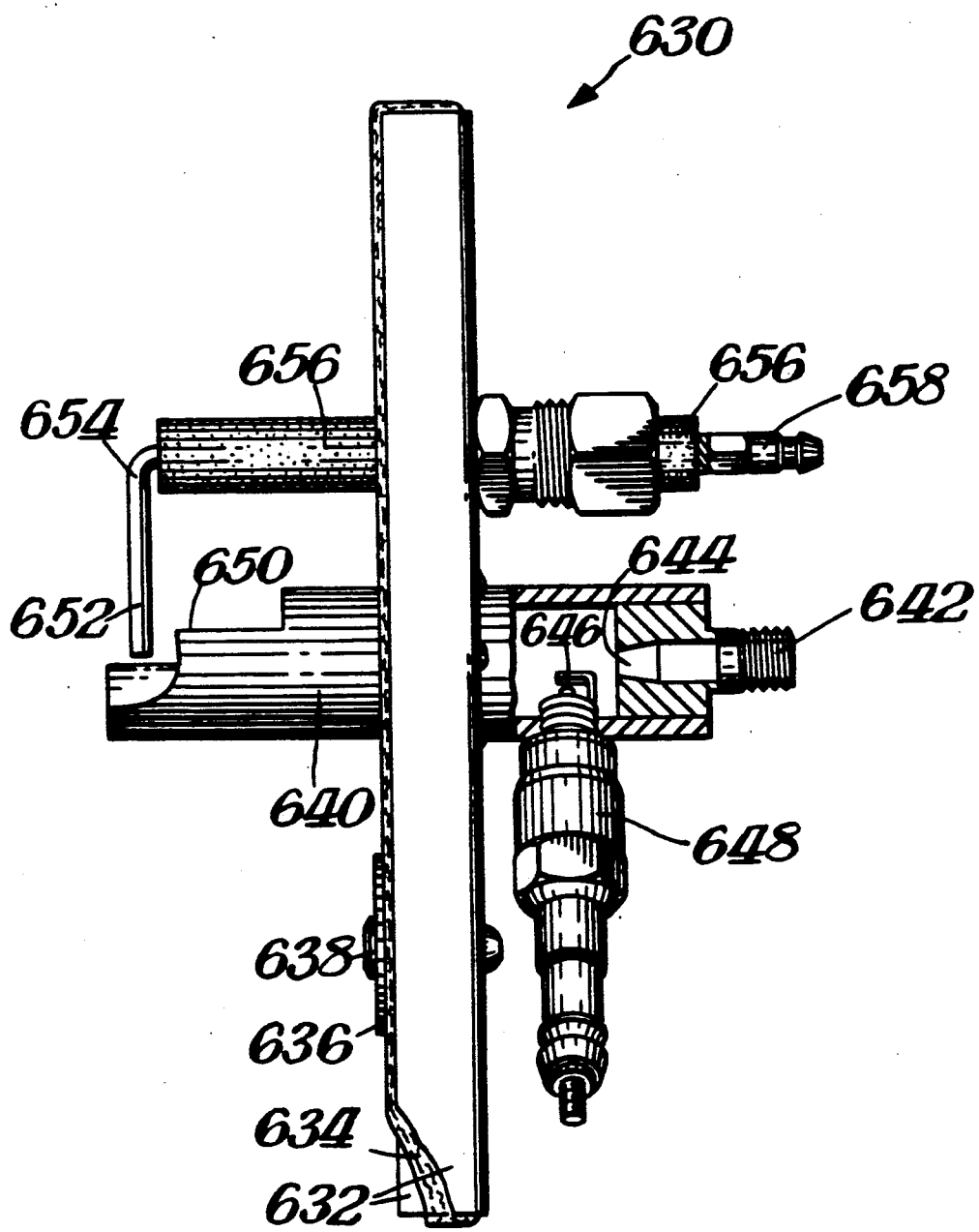

INFRA-RED HEATING

The present application is a continuation-in-part of the following earlier applications:

| Ser. No. | Filing Date |
|---|---|
| 329,551 | March 28, 1989 (now U.S. Pat. No. 5,046,944) |
| 125,001 | January 4, 1988 (now U.S. Pat. No. 4,830,651) |
| 12,723 | February 9, 1987 (subsequently abandoned) |
| 771,722 | September 3, 1985 (now U.S. Pat. No. 5,024,596) | which in turn are direct or indirect continuations-in-part of the following still earlier applications:

| Ser. No. | Filing Date | Status |
|---|---|---|
| 76,674 | July 23, 1987 | Abandoned |
| 831,795 | February 19, 1986 | 4,722,681 |
| 752,908 | July 8, 1985 | 4,604,054 |
| 628,989 | July 9, 1984 | 4,589,843 |
| 592,793 | March 23, 1984 | 4,654,000 |
| 567,270 | December 30, 1983 | Abandoned |
| 509,161 | June 29, 1983 | 4,500,823 |
| 435,412 | October 20, 1982 | Abandoned |
| 312,730 | October 19, 1981 | 4,443,185 |
| 292,167 | August 12, 1981 | 4,474,552 |
| 279,081 | June 30, 1981 | 4,416,618 |
| 238,418 | February 26, 1981 | 4,447,205 |
| 186,491 | September 12, 1980 | 4,378,207 |
| 94,901 | November 16, 1979 | 4,272,238 |

The present invention is related to apparatus for generating infra-red radiation, and the manufacture and use of such apparatus.

Among the objects of the present invention is the provision of improved apparatus for generating and using infra-red radiation.

The foregoing, as well as additional objects of the present invention, will be clear from the following description of several of its exemplifications, reference being made to the accompanying drawings wherein:

FIG. 1 schematically illustrates the making of corrugated board pursuant to the present invention;

FIG. 3 is a detailed side view with parts broken away, of a burner of the construction of FIG. 2;

FIG. 4 is a view of the burner construction of FIG. 2, taken from the face of the burner;

FIG. 11 is a side view of yet another web-heating apparatus incorporating the present invention;

FIG. 12 is a view of the apparatus of FIG. 11, taken from its inlet end;

FIG. 15 is a somewhat diagrammatic sectional view of a further modified embodiment;

FIGS. 16, 17 and 18 are very schematic side views of variations of the embodiment of FIG. 15;

FIG. 19 is a vertical sectional view of a downwardly firing burner with a specially re-enforced matrix;

FIG. 20 is an enlarged detailed view of the re-enforcement of FIG. 19;

FIG. 21 is a side view of the interior of FIG. 20, looking from line 21—21;

FIG. 25 shows an ignition and sensing combination that can be used with the burner of the present invention;

The infra-red generators of the present invention generally have a felted fiber matrix pad with extended surfaces and at least about ½ inch thick, through which pad a gaseous combustion mixture is passed to emerge from one surface and to burn at that surface to heat that surface to incandescence and thus generate infra-red energy. Generators of this type are described in the above-noted parent applications and patents.

Figure 1:
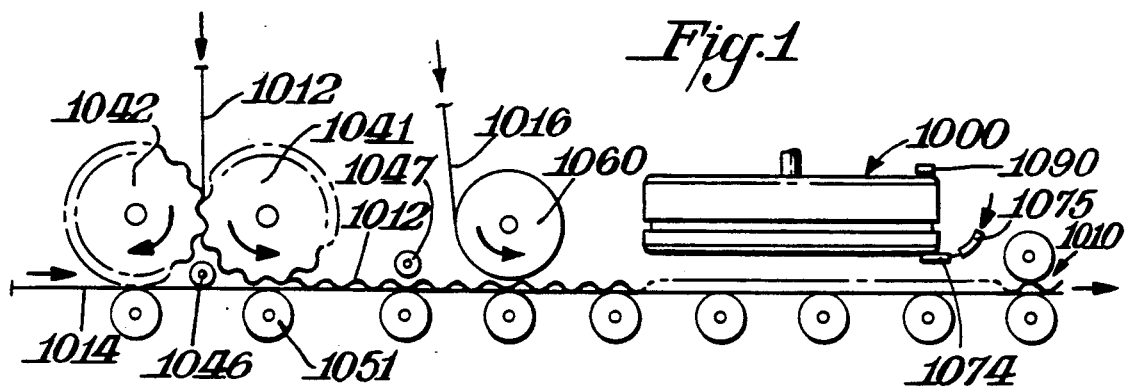

FIG. 1 illustrates the use of a burner to manufacture corrugated board 1010 from a corrugated core sheet 1012, a lower face sheet 1014, and an upper face sheet 1016. Corrugating rollers 1041, 1042 corrugate the core sheet 1012 where these rollers mesh, and roller 1041 carries the corrugated sheet past an applicator roll 1046 that applied adhesive to the lower edge of each corrugation. Roller 1041 also presses the thus-coated core sheet against the lower face sheet 1014 which is supported by a backing roller 1051.

Face sheet 1014 with the corrugated core sheet adhered to it moves to the right as shown in this figure, carrying the top of the core sheet past a second applicator roll 1047 which applies adhesive to the top edge of each corrugation. This assembly then is covered by the top face sheet 1016 introduced against the adhesive-coated corrugation after the lower face sheet is pressed at roller 1051, so that the adhesion of the top sheet is best reinforced by the application of heat.

To this end a burner 1000 is shown as held above the face sheet just down-stream of roller 1060, firing downwardly onto the face sheet. Only a few seconds exposure to such heating will set the top face adhesive. Heating can similarly be provided for the lower face sheet if desired. Also the freshly assembled sheets can be gripped by continuous conveyor belts pressing against one or both face sheets to more securely keep the sheets pressed as they advance to the heater and are withdrawn from it.

Burner 1000 is shown as provided with an electrically lit gas pilot light more fully illustrated in U.S. Pat. No. 4,272,238, but it can also be equipped with re-radiation and/or confining boards as in FIG. 18 of Ser. No. 186,491. It is also helpful to have an additional burner heating the lower face of the assembled corrugated board, as well as further burners preheating the lower face of sheet 1016 as well as the upper face of sheet 1014 just before these sheets reach the feed positions shown in FIG. 1. Of particular help is the orientation of the burner so that the hot combusted gases they generate become trapped in the corrugations and thus continue to supply heat after the corrugated sheet leaves the burner zone. Thus, lower sheet 1014 can be fed upwardly rather than laterally to roller 1051, and an upwardly facing burner can be mounted under the corrugated sheet 1012 where it is carried by corrugating roll 1041 toward roller 1051.

The infra-red energy radiated by ceramic mat burners has a very high power density. It can, for example, cure a polymerizable silicone coating with as little as 5 seconds of radiation. It is also very effective for drying wet webs of paper or the like without the help of any steam-heated rolls.

Figure 2:
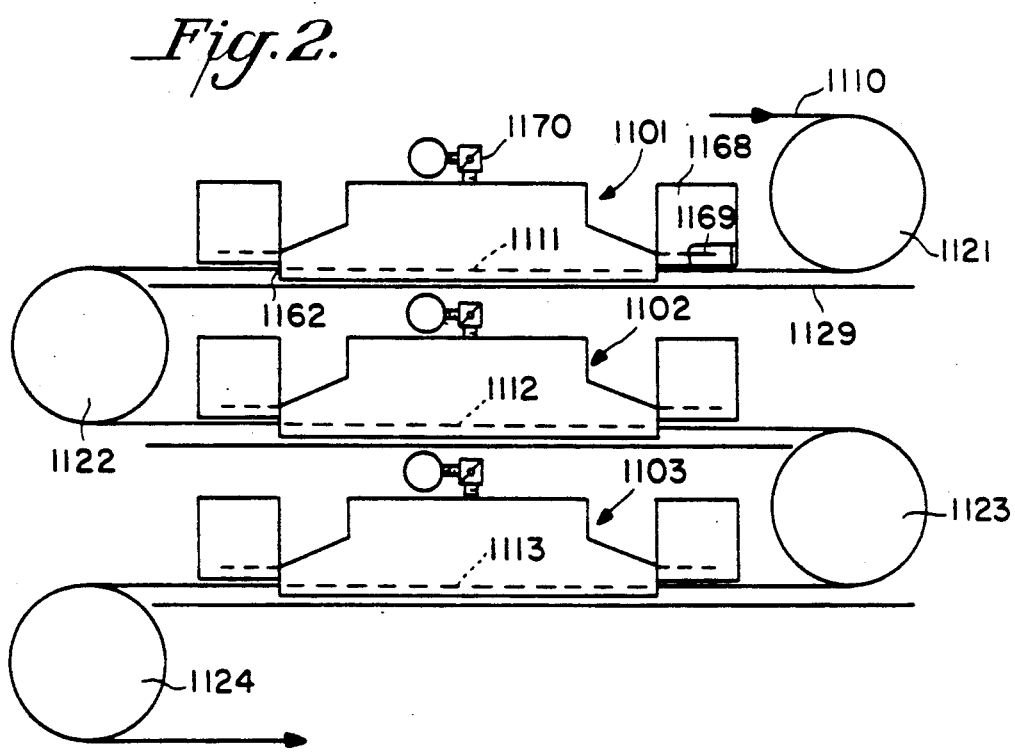
FIG. 2 is a schematic side view of a further embodiment of the present invention.

The apparatus of FIG. 2 has a series of rows of downwardly-facing burners, three rows of which are shown at 1101, 1102 and 1103. A web of wet paper 1110 makes a series of passes at 1111, 1112 and 1113 below the faces of the burners, with the help of reversing rolls 1121, 1122, 1123 and 1124. The paper can then be wound up, or if further drying is needed can be exposed to additional burners or looped over steam cans or other drying equipment. If desired, all or some of the reversing rolls 1121, 1124 can be internally heated as by steam or other fluid, to make the drying apparatus more compact.

Figure 5:
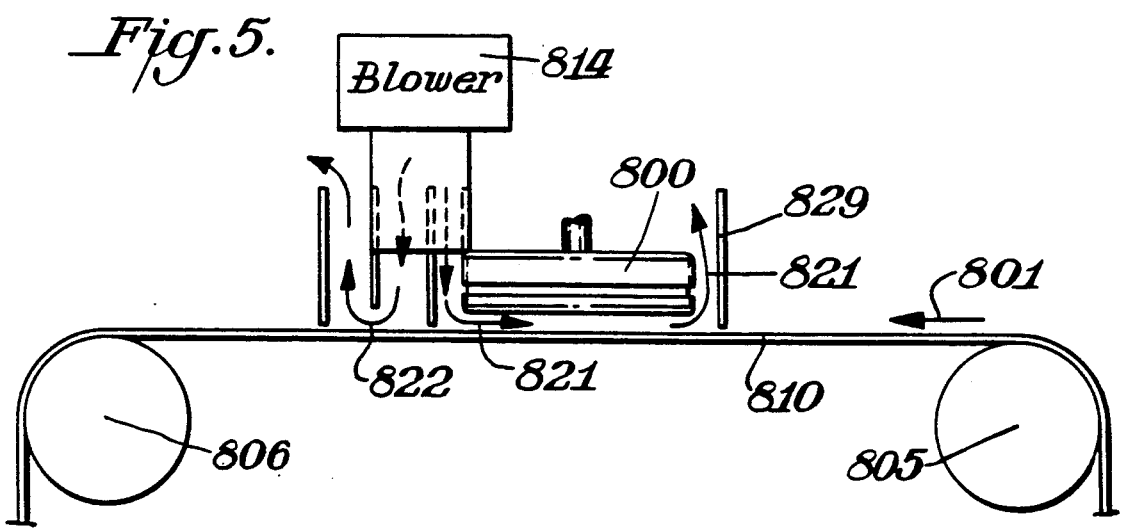
FIGS. 5, 6, 7 and 8 are schematic side views of additional heating apparatus typical of the present invention.

Each row of burners has a set of relatively small side-by-side individual burners 1130 similar to the burner of FIG. 5 of Ser. No. 186,491. As shown in FIG. 3, each burner 1130 has a generally rectangular metal body 1132 of metal like aluminum that conducts heat very well, and with a wall thickness of about ⅛ inch so that it is thick enough to effectively conduct away excessive heat. In FIG. 3 the burner has a combustion mixture deflector plate 1134 supported by posts 1135 secured to the plate and to the back wall 1136 of the burner body. The burner body, plate, and posts are preferably brazed together, as by the molten flux dip brazing technique referred to in U.S. Pat. No. 4,272,238.

A single insulation block or pad can cover the backs of an entire row of burners, if desired, or can cover a single back or any other number of adjacent backs.

The burner sides 1155 that are aligned to make the leading and trailing burner edges across which the paper 1110 moves, are shown in FIG. 3 as fitted with insulation blocks 1157 that are molded into angularly related flanges 1158 and 1159. Flanges 1158 are clamped against sides 1155 with the help of posts 1160 similar to posts 1135 that are only secured to the burner side walls. Insulation flanges 1159 flare outwardly from the burner faces, preferably at an angle of about 60 to 80 degrees from the vertical. The lower face 1163 of these flaring flanges can have its surface area effectively increased as by a succession of adjacent grooves 1161. The width of flanges 1159 is preferably from about ⅛ to about ½ the width of the burners, in order to take full advantage of the heating effects of the hot combustion gases discharging from the burner faces when the burners are operating.

As shown in FIG. 2 the hot combustion gases are kept by thermal deflectors 1162 from escaping over the free edges of the burner walls 1164 at the ends of each row. Deflectors 1162 can be mounted to walls 1164 the same way blocks 1157 are mounted, but the deflectors preferably extend downwardly lower than the bottom edges of blocks 1157, to a level below the path of the paper 1110. The hot combustion gases rise and will accordingly flow upwardly around the bottom edges of blocks 1157, as shown by arrows 1165.

FIG. 2 also shows exhaust ducts 1168 that collect the hot combustion gases which can then be used as a heat source for other operations or to pass through rolls 1121–1124 to heat them. Ducts 1168 can be provided with baffles 1169 that direct the hot gases over a few more inches of the paper 1110 before those gases are withdrawn.

Each individual burner of a row can have its own feed trimming valve 1170 that can be adjusted to offset uneven heating effects that may be caused by differences in the porosities of the matrix faces of adjacent burners. The burners in each row can be mounted with their adjacent sides in direct contact, as in FIG. 5 of Ser. No,. 186,491, but preferably a compressible pad 1172 of thermally resistant material such as ceramic fibers is fitted between adjacent burners in FIG. 4. Such a pad about ⅛ inch thick compressed to half that thickness does not make too much of a gap int he incandescent surface defined by the burner faces, and it also helps to keep the burner-to-burner joints plugged against the leakage of hot combustion gases as a result of thermal expansion during operation.

The radiation gaps between individual burners of a row can have their radiation interrupting effects reduced by shaping the burners so that these gaps extend at an angle with respect to the direction of paper movement. This will spread the radiation interrupting effect over wider portions of the paper, or even over the entire width of the paper.

The radiation interruption at the gaps is also reduced by a tapered thickness reduction at the free edges of the burner side walls, as shown in FIG. 31 of Ser. No. 94,901. The burner matrixes 1176 are sufficiently resilient that they can be squeezed into place against such tapered walls and thus effectively reduce the width of the outer lip of the wall to about 1/16 inch even though the balance of the wall is about ⅛ inch thick.

As pointed out above, the movement of the hot combustion gases over the flared surfaces 1160 heat up those surfaces to temperatures that come close to the temperature of the incandescent burner faces, particularly when those surfaces are of low density thermal insulation. The resulting high temperature of surfaces 1163 will accordingly generate additional infra-red radiation that helps dry the paper 1110. This additional drying is provided without increasing the amount of fuel used, so that the fuel efficiency is greatly improved.

FIG. 4 further shows the provision of a burner igniter in the form of a spark-fired pilot flame director 1178. This can be provided with its own flame-detecting rod 1179, or if desired an ultra-violet detector 1180 can be fitted at the opposite end of a row of burners, to detect burner operation when the burners are being lit, and automatically shut down the gas feed if the burners do not ignite or if they should be inadvertently extinguished.

The grooving 1161 preferably has a depth of at least about ⅛ inch, and this depth can be as much ½ inch. The grooving effectively increases the surface 1161 as compared to a perfectly flat surface, and an increase of at least about 50% is desired. To this end the profile of the grooves can be triangular, rectangular, sinusoidal, or have any other shape.

The combustion gases discharging from the far ends of the surface 1161 can still be sufficiently hot to warrant their use as for heating a further radiating surface. Thus, those gases can be sucked through a porous insulator such as a ceramic fiber matrix positioned as an outer extension of surfaces 1161. The resulting relatively forceful flow of still hot gas through the porous matrix heats it up more effectively than the surface 1161 is heated, so that the heated face of the porous ceramic fiber matrix can contribute a significant amount of additional infra-red radiation.

The user of the surfaces such as 1161, with or without the foregoing extensions improves the operation of any fuel-fired burner that generates hot combustion gases. Thus burners 1130 can be replaced by ceramic tile burners, metal screen burners, or ceramic cup type burners, or even direct flame burners, and in each case the burner operation shows a similar improvement.

The individual burners 1130 in the assembly shown in FIG. 4 are preferably dimensioned so that different burners or groups of burners 1130 can be operated. In this way all the burners can be operated to heat a web 1110 of maximum width, and smaller numbers of burners can be operated to heat webs of smaller widths. Shutting down one or more burners has been generally effected with minimum construction cost by shutting off the flow of the propane or other combustible gas to those burners while permitting continued flow to those burners of the air otherwise mixed with the combustible gas to make the combustion mixture.

The same combustible gas shut-off has been used for emergency shut-downs, as for example, when the web stops advancing and it is necessary to keep the stopped web from becoming charred by the burners. However, such gas shut-offs are not prompt enough for certain stoppages such as when the web is a paper being printed at high speed with ink that requires heat treatment to dry rapidly. Such printing machines can be stopped in less than a second or two when there is an emergency such as tearing of the paper web. For such very abrupt stopping, it is preferred to rapidly trip such the air supply to the mixer. This immediately stops the flow of combustion mixture and extinguishes the burner. The ceramic fiber matrix on which the combustion had been taking place, prevents flash back of the flame toward the mixing equipment and thus prevents damage.

The standard mixing equipment includes a so-called zero-pressure regulator which is designed to prevent flow of gas to the burner when the flow of air is interrupted, but when other types of mixing equipment is used, it is desirable to have the emergency shut-down at both the air flow and the gas flow. Electrically-operated solenoid valves made it simple to simultaneously and very abruptly shut off both those flows.

Such simultaneous shut-offs may also be desirable even when zero-pressure regulators are used for mixing. The use of a solenoid-operated gas valve is very helpful when an installation contains several burners some of which are to be selectively kept out of use on occasion. Also, the closing of the gas valve permits simpler cycling of the burner safety system for relighting.

It is generally desirable to have the burners located below the work being irradiated inasmuch as the burner body is then not subjected to so much heating and the rising hot combustion products remain longer in contact with the work thus increasing the heating effect. In some cases, however, the only practical installation has the burner firing face down over the work.

FIG. 5 shows an installation of this type in a portion of a paper-making machine preceding all or most of the steam can driers. A paper web 810 120 inches wide is here illustrated as moving in the direction of arrow 801 between two rollers 805 and 806. Over the web is positioned a burner 800 firing face down. To assist in the removal of moist air from adjacent the burner and thus speed the drying action, a blower 814 is arranged to blow a stream of low-humidity air between the burner and the web, as indicated by the arrows 821. This steam moves longitudinally of the web and transversely of the burner, countercurrent to the paper movement, and a baffle 829 can be provided to help deflect the stream away from the web after the air in it has become heavily laden with moisture.

Another stream of dry air 822 can be used to flow in the opposite direction along the web to further help remove from adjacent the web the moisture vaporized by the heat treatment. The burner and blower assembly can be placed under the web 810 facing upwardly, or two such assemblies can be used, one facing down from above and the other facing up from below. Instead of or in addition to blowing air against the web, suction can be used to help suck some or all of the hot combustion products and vapors along and away from the web. Air jets can also be used to move the combustion products.

Figure 6:
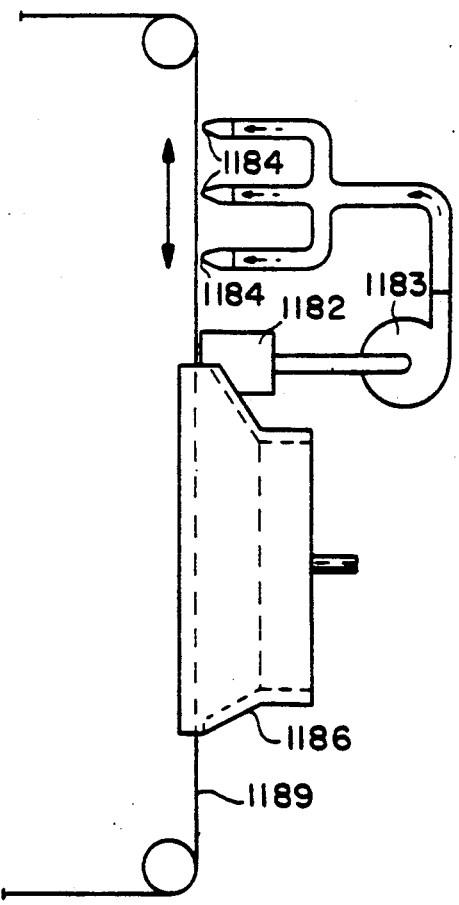

FIG. 6 illustrates a modified arrangement used to heat paper or other webs that are moving vertically rather than horizontally. In such an orientation the hot combustion gases need not flow downwardly out of the bottom edges 1186 of the burner units, so that those edges can be relatively short lengths of insulation that are horizontal or only mildly flared—about 20 to 30 degrees down from the horizontal. Those lower edges an also be brought relatively close to the moving web 1189—about ¼ inch—to limit the ingress of ambient relatively cool air into the hot combustion gases.

To improve the heating effect of the hot combustion gases they are withdrawn through a top exhaust duct 1182 and propelled by a lower 1183 to jets 1184 from which those hot gases are jetted against the moving web 1189. This breaks up the boundary layer barrier of steam or the like that can be present on the web.

The burners of the present invention dry paper with particular effectiveness. The radiation they emit is about as efficient in removing the last bit of excess water from an almost bone-dry paper, as it is in removing the first bit of water from a very moist sheet, and this permits an unexpectedly sharp drop in the bulk of a paper dryer.

However, textile webs of cotton, wool, polyester, rayon, polypropylene, dacron and the like, or mixtures of such fibers, as well as plastic films are also very efficiently dried or cured with such burners.

A guide, such as plate 1129 in FIG. 2, can be used to assist with the threading of web 1110 past the burners in preparation for a drying run.

Infra-red radiation is also highly effective for preheating plastic sheets to prepare them for pressure or suction forming. Thus, a continuous sheet of polystyrene or the like can be moved in steps toward a cutting and molding press that stamps out successive suitably dimensioned portions and successively molds them into shape, with the sheet subjected to any of the irradiation arrangements described above immediately before it reaches the cutting and molding press. By making the irradiation zone equal in sheet travel length to the length of each sheet advancing step, uniform pre-heating of the sheet is obtained.

Where it is necessary to limit the amount of pre-heating so that an incandescent radiator surface must be substantially smaller than the length of an advancing step, the advancing sheet can be arranged to first advance at an uninterrupted uniform rate past a short irradiation zone, and then be carried as by a tenter frame assembly that permits stepwise feeding to the cutting and molding press.

In the event the preheating tends to cause the plastic sheet to shrink in width or length, the heated sheet can be placed under tension, transversely or longitudinally or both. To this end a tenter frame type step advancing means can be provided with weighting rolls to apply longitudinal tension to loops of the sheet, and can additionally or alternatively be fitted with clamps that grip the side edges of the sheet and in this way apply transverse tension.

Burning a gaseous hydrocarbon fuel at the surface of a ceramic fiber matrix has been found to yield exceptionally small amounts of carbon monoxide and nitrogen oxides. Burners of this type are accordingly highly suited for industrial and domestic space heating by merely facing the incandescent matrix toward the space and the people to be warmed. The gaseous combustion products leaving the matrix can thus be permitted to enter and diffuse through the space being warmed, without increasing the carbon monoxide and nitrogen oxide content of the air in the space as much as it would be increased by open flames of conventional fuel-fired heaters or even cooking ranges. A matrix type space heater is accordingly very inexpensively installed. Since it is also a very effective generator of infra-red energy and warms both through such infra-red generation as well as by the heating effects of its hot combustion products, it also makes a highly efficient installation.

If desired, such a space heater can be equipped with a hood that collects its combustion products as they rise from a laterally directed vertical matrix face, for example, and vents them through a chimney or stack. Inasmuch as matrix combustion is essentially stoichiometric there is essentially no excess air in those combustion products so that the cross-sectional area of the stack or chimney can be quite small.

Figure 7:
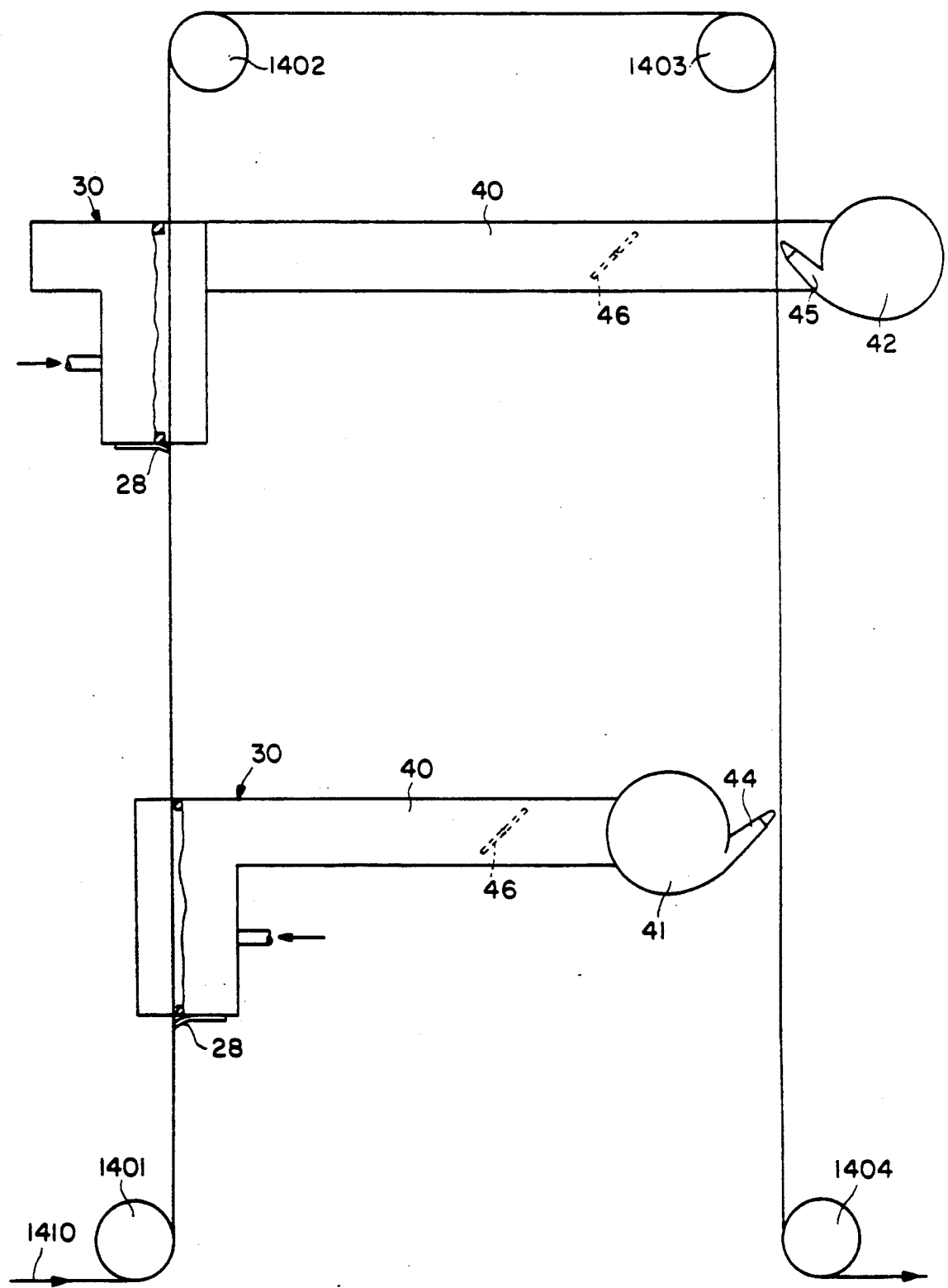

The pre-dryer of FIG. 7 has four rolls 1401, 1402, 1403 and 1404 that guide a freshly dyed textile web 1410 to set a stem-heated drying rolls (not illustrated) where the final drying is effected. Between rolls 1401 and 1402 the webs move upwardly and in this travel each of its faces is irradiated by a heater assembly 30 illustrated in FIG. 1 of Ser. No. 186,491. Each of these assemblies has a draw-off conduit 40 through which gaseous combustion products that are still quite hot, are withdrawn. These conduits 40 lead to the intake of blowers 41, 42 which have their discharge outlets 44, 45 directed to rapidly blow the discharged gases against the textile web as it descends between rolls 1403 and 1404.

The heater assemblies 30 can each have a scoop 28 that not only improves the drying action but also helps keep the web from fluttering as it moves upwardly. Such fluttering generally takes place, sometimes to a dangerous degree, in pre-dryers that have a substantial span between rollers 1401 and 1402.

The discharges of blowers 41 and 42 are preferably arranged to propel against the textile web, streams of hot gas at a velocity of at least about 10 linear feet per second. The velocity brings the hot stream in very good heat exchange relation with the web. The heat exchange relation is also improved by inclining the hot streams about 30 to about 60 degrees upwardly. An enclosure can be provided around the downwardly moving textile web to help confine the blown streams near that web as they move upwardly alongside it.

FIG. 7 also shows an adjustment device in the form of a damper 46 in conduits 40. This damper can be opened or closed to provide the optimum drying effect. Thus the re-radiator 26 of assembly 30 will supply the beat heating when it is at the highest possible temperature, and damper 46 can be adjusted while the surface temperature of the re-radiator is measured with a pyrometer. Opening the damper too wide can increase the suction in the discharge plenum 35 so much as to draw ambient air in through the re-radiator and this will cool down the re-radiator surface. On the other hand closing the damper too much reduces the volume of hot gas blown through the pump outlet. Optimum drying is generally effected when the damper is as far open as it can be set and still keep the re-radiator surface very hot.

Only one drying assembly can be used in the apparatus of FIG. 7, or conversely a large number of them can be used so that little or no steam roll drying is needed.

Figure 9:
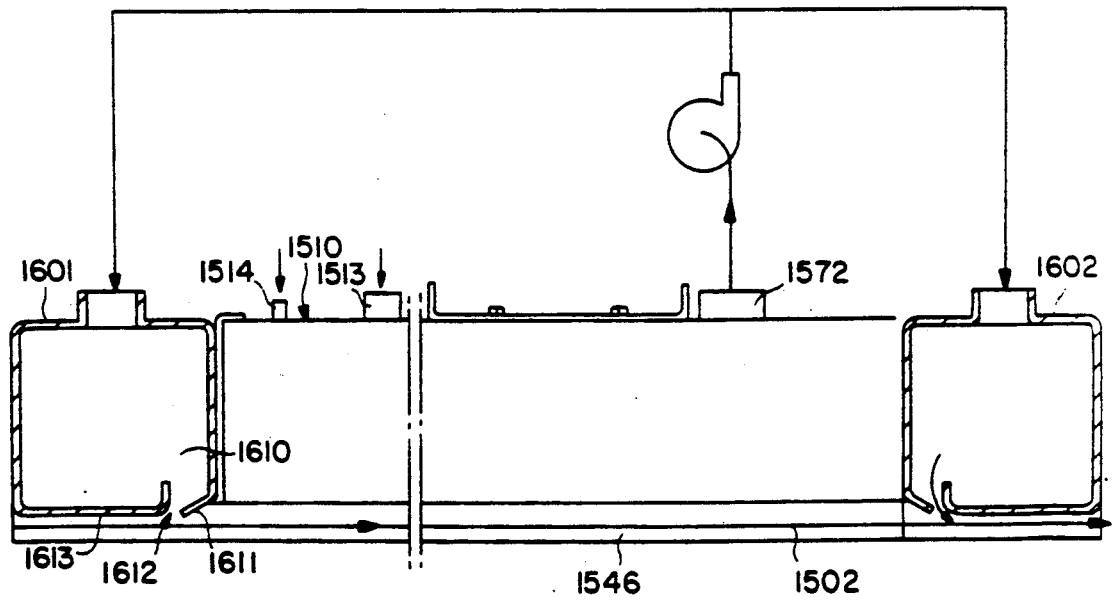
FIG. 9 is a partly sectional view of a variation of the FIG. 3 apparatus.

As shown in FIG. 9 the infra-red radiating burner 1510 can have a Bernouilli airfoil floating dryer 1601 preceding it in the path through which web 1502 moves during the drying. Dryer 1601 is an elongated box that can be generally rectangular in cross-section and provided with a very narrow slot 1610 through which a stream of heated gas such as air is expelled at a velocity of ten to fourteen thousand linear feet per minute. The slot lips 1611, 1612 are shaped to divert the expelled stream at an acute angle, about 30 to 60 degrees away from the box wall 1613 thus forms upstream lip 1612. At such stream velocities the stream moves along the surface of substrate 1502 and develops Bernouilli forces that urge the substrate toward, but also hold it short a fraction of an inch from wall 1613. This type of gas flow is rather turbulent and very effectively subjects the substrate to the drying action of that stream.

The gas stream for dryer 1601 is preferably taken from the hot combustion products discharged by burner 1510, as by enclosing the combined dryer structure in a housing into which all the hot gases flow, and from which a blower blow some of those gases into the interior of the box of dryer 1601.

Dryer 1601 is shown as directing its discharged stream counter-current to the movement of the substrate but can alternatively discharge its drying stream in the opposite direction so that it moves co-current with the substrate. Moreover, two or more such Bernouilli airfoil dryers can be fitted to the leading wall of burner 1510, and these can have their gas streams all directed counter-current, or all co-current, or some one way and the remainder the other.

Another Bernouilli airfoil drying 1602 is shown as fitted to the exit end of dryer 1510 and can operate like the preceding dryer or dryers 1601. Also, the re-radiator panel 1560 can be eliminated along with its mounting structure, so that the exit Bernouilli airfoil dryer 1608 directly follows irradiating burner 1510. The Bernouilli airfoil drying combination does not require the build-up of any significant depth of hot gases under the burner matrix or under the re-radiation panel, if used.

Figure 8:
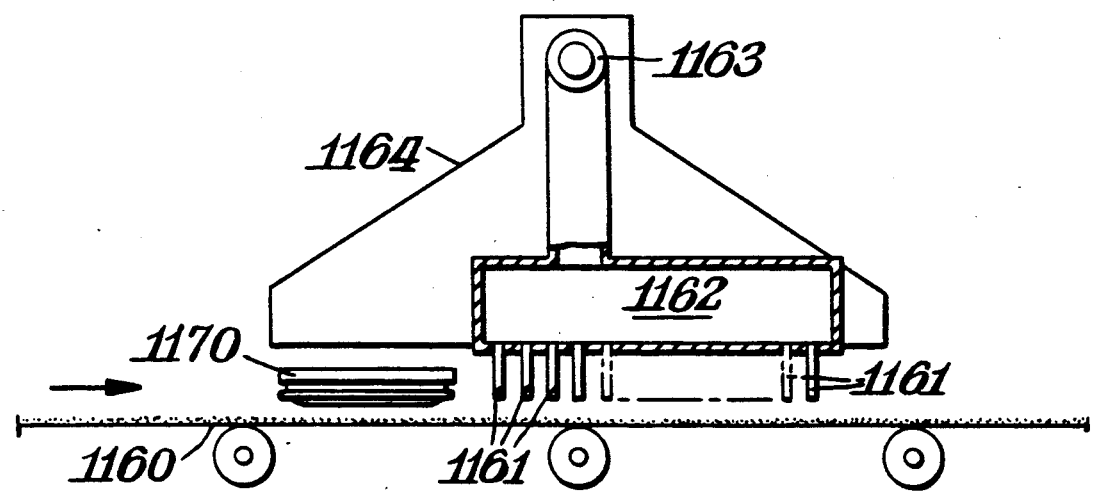
Figure 10:
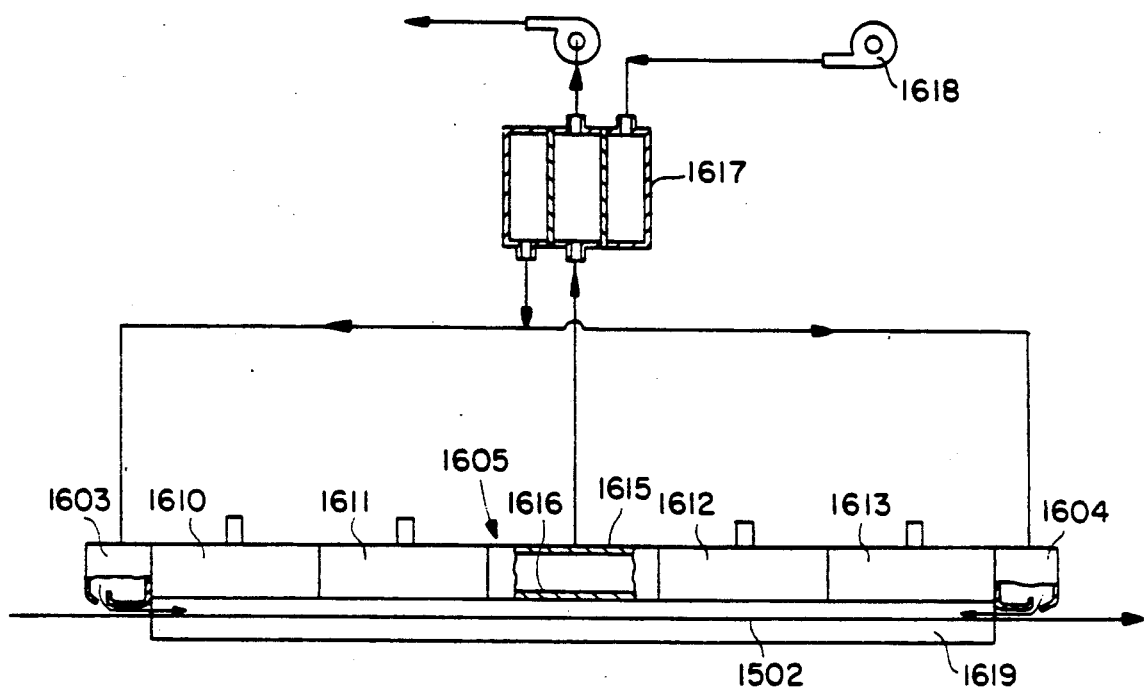
FIG. 10 is a somewhat diagrammatic view of a further modified heating apparatus of the present invention.

A preferred modification of the construction of FIG. 8 is illustrated in FIG. 10. Here a set of Bernouilli airfoil guides 1603, 1604 are secured to the respective upstream and downstream ends of a burner combination 1605 containing four burners 1610, 1611, 1612 and 1613. Centrally of the burners is an exhaust gas flow-through box 1615 whose lower wall is a porous re-radiator panel 1616 corresponding to panel 1159 of FIG. 4.

Airfoils 1603, 1604 are arranged to direct their discharge air streams towards the burners adjacent to them, so that they not only guide the web 1502 but also flush toward the exhaust gas flow-through box all of the hot burner combustion products along with whatever vapors are expelled from the web by the heating action. In many cases the web contains combustible solvents or the like when it enters the apparatus, and those contents are vaporized by the heating action. These vapors are kept from significant leakage to the atmosphere, and are swept toward box 1615. When those vapors are oxidizable they will be oxidized, generally by the time they reach panel 1616 so that only oxidation products are discharged from that box. The heat content of the thus-discharged products is recovered in a heat exchanger 1617 where they heat up an incoming stream of fresh air blown through by blower 1618. The resulting heated air is supplied to the airfoils 1603, 1604, and thus supplies oxygen for the oxidizing process as well as any additional heating of the web.

Skirts 1619 depending from the side edges of the burner combination 1605 help keep the airfoil discharges and burner discharges from escaping at the side edges of the web. As in the construction of FIG. 3, panel 1616 can be impregnated with oxidation catalyst such as platinum or palladium to assist with the oxidation of vapors.

FIG. 11 shows a heat-treating apparatus 10 for drying porous fabrics such as non-felted open webs of long-fibered thin sheets. Such a web 12 is delivered from a web-forming station, for example, is received on the upper run 14 of an endless conveyor belt that carries the web through a heating station defined by a burner assembly 18. Assembly 18 is a collection of gas-fired burners 20, 21, 22, 23, 24, 25, 26, 27, 28 and 29, each extending across the width of the web 12 facing downwardly to heat the web as it is carried by the conveyor. The burners can be built along the lines shown in Ser. No. 186,491, but are mounted in pairs each pair being spaced from the next to provide gaps 31 that also extend the width of the web. A set of idler rolls 33 helps support the conveyor run 14, and as shown these rolls are preferably located where they do not receive the full blast of the infra-red energy generated by the burners.

Conveyor 16 is porous and is made of strands that withstand temperatures up to 400° F. or 450° F. A metal mesh conveyor belt can be used, but meshes of thermally resistant cords are particularly desirable since they do not carry off so much heat and the cords themselves are somewhat transmissive of infra-red energy. Also a fabric mesh conveyor is very light in weight and is much simpler to operate. Belt thickness as little as 1 millimeter are all that is needed. Aramid, qiana and other temperature-resistant fibers, tire cord grade Kevlar fibers for example, make good conveyor cords, and even nylon fibers can be used where they are not heated above about 250° F.

The conveyor face that receives web 12 is preferably coated with poly(tetrafluoroethylene) to minimize the danger of the web sticking to the upper arm particularly when the web arrives in wet condition.

A series of suction boxes 41, 42, 43, 44, 45 and 46 is placed below the conveyor run 14, with their suction mouths 39 very close to or even contacting the lower face of the conveyor there. Mouths can be made of poly(tetrafluoroethylene) to minimize friction. The boxes are connected to a suction manifold 37 at one or both sides of the apparatus, and these manifolds are in turn connected to a suction blower. Between the suction boxes there is fitted infra-red re-radiators which can merely be sheets 44 of thermal insulation opaque to infra-red. The upper surface of these sheets have some of the burners+ infra-red energy impinged on them through the porosities in the web and in the conveyor, and those surfaces are thus heated and themselves radiate infrared energy. The re-radiated infra-red energy helps supply additional heat to the bottom of web 12.

The fibers of which web 12 is made, may also be partly transparent to the infra-red generation, and thus permit more infra-red energy to reach the re-radiators.

The application of suction t the interiors of the suction boxes causes them to suck in gas through the porosities in the web and in the conveyor. Some of the very hot gaseous combustion products discharged by the burners are thus drawn through the web to further increase the heating effect. Also where the web is wet with water or contains any other volatilizable material, the movement of the sucked gases through the web greatly increases the removal of such material.

The gaps 31 between burner pairs permit the dilution of the hot combustion products with ambient air from between the burner pairs, so that mixtures of these two gases can be sucked through the web. Such mixtures can have temperatures much lower than the undiluted combustion gases, and some webs can be damaged by such undiluted gases. At the gaps the burners can carry adjusting devices such as slides 48 that can be shifted to cover or partially cover the gaps.

The degree of suction at the suction box mouths can be selected between about 1 and about 200 inches of water column, and the burner mouths sized to cause all or only some of the hot combustion gases to be sucked through the web, with or without dilution of ambient air. To help assure that all of those hot combustion gases are available to be sucked through the web, the burners can be fitted with end skirts 50 that extend downwardly more than the side walls 52. This causes the hot combustion gases to build up under the burner face until they spill out below the bottoms of the side walls.

The conveyor strands or cords preferably provide spaces of about 1to about 4 millimeters between them, and such openings will not have any significant effect on the manner in which the web is supported by the conveyor. The side margins 56 of the conveyor can be made with less or no inter-strand spacing, and can be completely coated to strengthen it against tearing. An impervious edge boundary so provided also helps confine the boundaries of the suction effects and reduces suction losses.

The assembly of FIG. 11 can be mounted in a framework 60 only about 18 feet long, and does a drying job about an effective as 15 steam-heated drying rolls each 5 feet in diameter. Shorter burner assemblies can be used if less drying is desired.

The individual burners 20, 21, etc. can be the air-seal type or of the non-air-seal type, both described in Ser. No. 186,491. Air-seal burners discharge significant amount of air around the hot combustion gases, so that those gases are cooled somewhat by the discharged air before they flow out past side-walls 52. The air-seal flow can, if desired, be increased to the point that no additional ambient air is needed at gaps 31.

The burners are shown as of the ceramic fiber type, that is they have a porous felted ceramic fibers mat through the thickness of which is passed the gas-air combustion mixture to e burned, and the mixture burns as it emerges form the mat. This burning heats to incandescence the fibers at the face from which the combustion mixture emerges, and these incandescent fibers generate the infra-red energy which is so effective. However, other types of gas-fired infra-red burners can also be used, such as those that have ceramic plates heated to incandescence by gas flames, or those that have metal screening heated to incandescence. So-called catalytic burners are not desirable inasmuch as they are intended for operation at temperatures too low to do a good job of heating webs.

Assembly 10 may also be provided with a hood 66 that can be fitted with a blower to collect and remove combustion products and vapors. The web path in assembly 10 can be tilted rather than horizontal, so that the web moves in a direction inclined upwardly or downwardly, or even perfectly vertical.

Figure 13:
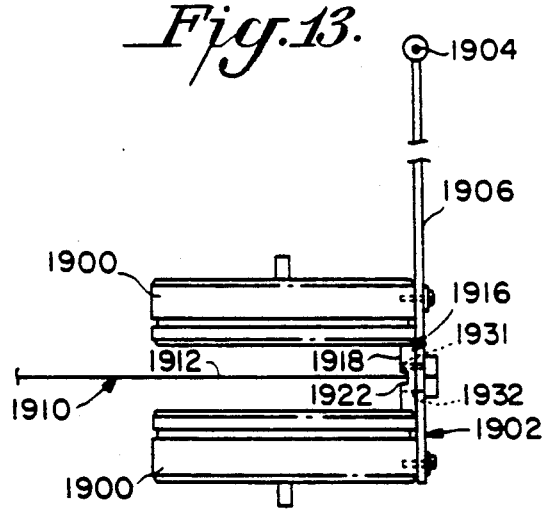
FIG. 13 is a front view of an apparatus for irradiating the edges of sheets in accordance with the present invention.

The construction of FIG. 13 is used to help dry one or both edges of a paper web. When paper dryers are fed with undryed paper wider than preferred, the outermost few inches of the edges 1912 of the paper generally do not dry sufficiently. According to the present invention narrow burners 1900 are placed over and/or under one or both edges 1912 to more closely equalize the drying in such an installation.

In FIG. 13 two burners 1900 are shown as held on an outer carry plate 1920 that is pivoted from overhead pin 1904 by means of an elongated beam 1906, so that the burners can be pivotally retracted from the illustrated position, to simplify the threading of the paper web 1910 through the dryer. The burners are easily restored to their illustrative operative position where they are latched in place.

The fuel supply conduits to the burners 1900 are made flexible to yield with the foregoing pivotal suction or the conduits can be provided with swivel joints, the swivel axes of which are aligned with pin 1904, so that the portions of the conduits secured to the burners can pivot with the burners. Where the burners have air-seal margins, a blower can be mounted on one of the burner 1900 or on carry plate 1902 or beam 1906, to supply a stream of air for the air-seals, and if desired all the air for the combustion mixtures as well.

Carry plate 1902 is also shown as holding a pad 1916 of thermal insulation such as one made of felted ceramic fibers. This pad is not needed, but if used improves the drying efficiency by acting as an absorber and re-radiator of infra-red rays. It absorbs infra-fred radiation emanating from the faces of burners 1900 and its surface 1918 becomes quite hot in doing so. This hot surface re-radiates infra-red energy to the surfaces of paper edge 1912 without losing much heat by conduction to the relatively cool carry plate 1902. Pad 1916 can be grooved as shown at 1922 to permit the paper edge to completely block direct radiation from one burner face to the other.

Passageways 1931, 1932 can be provided through the carry plate 1902 and through the pad 1916, so that the faces of the burners can be observed and thus monitored to assure proper operation. Automatic monitoring can be arranged by fitting a light or ultra-violet sensor to the passageways, and connecting them to automatically shut off all fuel flow to a burner whenever the burner face is not lit. For lighting the burners electric ignition such as shown in U.S. Pat. No. 4,157,155 can be used or, if desired, pilot flames with manual controls to override the sensors.

Groove 1922 can be flared to better permit radiation to reach the extreme margin of the paper. Burners 1900 can also be equipped with scoops and/or extensive re-radiator panels as in Ser. No. 186,491 and/or confining boards such as 1546 in FIG. 9.

Where two burners 1900 are used at one edge of the paper, they can be located face-to-face, or they can be offset so that they do not radiate directly at each other in the event the paper web 1910 tears or its edge 1912 is damaged or missing. Such direct counter-radiation can rapidly damage the burner faces, particularly if those faces are ceramic fiber mats, and to guard against such damage a photoelectric web edge detector can be located upstream from the burners and connected to shut off the flow of fuel to one or both burners when the edge 1912 is missing from the paper web.

A similar safeguard can be used to extinguish both burners when the paper web 1910 stops or slows down excessively. Even relatively low-temperature operation of the burners can rapidly scorch a stopped paper web.

Either or both burners 1900 can also be equipped with re-radiator panels. Where so equipped the assembly of one burner with its re-radiators can be placed directly opposite a similar second assembly but with each burner directly facing the re-radiator panel portion of the opposing assembly.

FIG. 8 also illustrates a desirable heating and drying combination of the present invention. Here a conveyor 1160, which can be of the belt or vibratory type, carries a layer of particles that are to be dried and/or heated. The layer first passes under infra-red generator 1170 which can have any of the gas-fixed constructions described above or in the parent applications or can be of the ceramic tile or wire mesh type. After the infra-red generator, the particles pass under an array of tubes 1161 through which there is projected downwardly, spaced streams of heated gas. This gas comes from a manifold 1162 into which it is blown by a blower 1163. The intake of the blower is connected to two hoods, one shown at 1164 as extending along one side of burner 1170 and manifold 1162. The other hood extends similarly along the other side of those structures.

Hoods 1164 suck up the hot combustion gases generated by burner 1170, as well as the gases blown out of the bottom of tubes 1161 after those gases have blown through the layer of particles. These sucked up gases can then be further heated by a burner upstream or downstream of blower 1163, and blown out against the layer of particles. However, if this blown out gas does not have to be as hot as, or hotter than, the hot combustion products from burner 1170, little or no auxiliary heating is needed in the sucking and blowing section. Where the blown gases cool too much in that section, a second burner 1170 can be added in front of the first burner so as to add more infra-fred irradiation as well as extra heat for the blown gases.

It is not necessary to seal in the gas collection and recirculation path of the construction of FIG. 8. This simplifies the construction and the sucking in of a little extra air is no significant problem.

Tubes 1161 can have their lower ends tightly or loosely fitted through holes in a horizontally-extending deflector plate. Alternatively a tube construction as in U.S. Pat. No. 4,235,591 can be used with or without the hot gas recycling of that patent. Even the blowing arrangement of U.S. Pat. No. 3,239,863, designed for dust removal, can be used to effectively blow heated gas over substrates to dry them.

Figure 14:
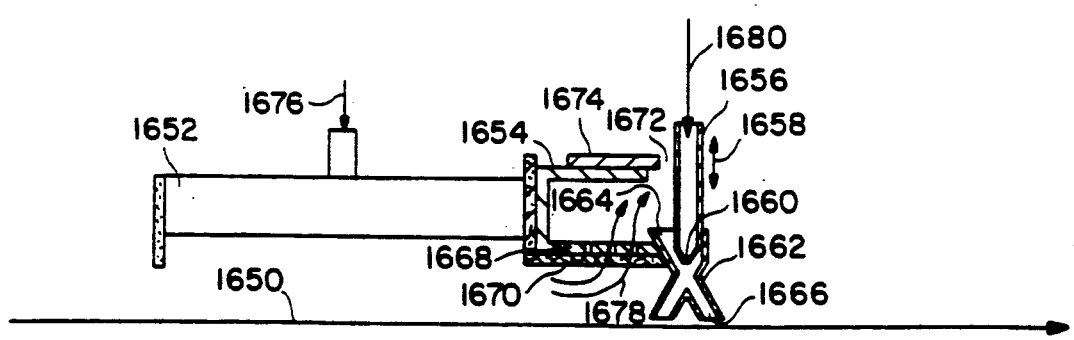
FIG. 14 is a partly detailed side view of a modified embodiment of the apparatus of FIG. 11.

FIG. 14 shows a heat-treating arrangement using an air jet arrangement to assist the heating. Here a wet paper web 1650 is passed under a gas-fired infra-red generator 1652 that can be of the air-seal or non-air-seal type and fires face down. To the downstream end of the burner is secured a box 1654, generally rectangular in cross section that can extend the full width of the burner in the direction transverse to the web movement. The downstream end of the box is closed or partially closed by an air jet duct 1656 that can be moved up and down as indicated by the double-headed arrow 1658. The lower end of the jet duct is tapered to a narrow jet nozzle 1660 that fits in and coacts with a downwardly-directed venturi 1662 whose upper end 1664 opens into box 1654, and whose lower end includes a diverter angle 1666 that splits downwardly jetted air into two streams, one directed down and upstream of the web, the other down and downstream of the web.

Box 1654 has its lower wall 1668 perforated and secured to the lower surface of that wall is a re-radiating ceramic fiber panel 1670. That panel can seal against the venturi to close off the bottom of box 1654. The top wall of the box does not reach quite as far as the jet duct 1656, leaving a gap 1672 that can be covered to varying degrees by a slide 1674.

In operation the burner is fired by a combustion mixture fed into it at arrow 1676. The hot combusted gases accumulate below the burner face and move toward the box 1654 as indicated at 1678. Air blown into jet duct 1656 as indicated at 1680 aspirated the gaseous contents of box 1654 out through the venturi 1662, thus lowering the pressure in the box and sucking the hot gaseous combustion products into the box through re-radiator panel 1670. The aspirated box contents are accordingly hot combustion products diluted with some ambient air as determined by the position of slide 1672. The jetted air also mixes with the separated air, and this mixture can be further adjusted by raising and lowering the jet ducts. Lowering that duct to its lower limit can bring it in contact with the venturi throat and thus essentially completely block the aspiration.

The direction of web movement can be opposite to that shown in FIG. 14, if desired. Additionally or alternatively a second burner-jet combination can be mounted downstream of the first to supplement the web treatment.

FIG. 15 illustrates a modified drying arrangement 1838 for webs 1802 of paper or textile or the like are wet with water or other volatilizable liquid. The structure of 1838 includes a gas-fired burner 1858 having a ceramic fiber matrix 1843 the outer face of which is generally parallel to a planar irradiation zone 1844 along which web 1890 is guided by rollers 1839, 1840. The burner holds it matrix 1843 in the vertical plane, and above the burner is a porous re-radiator panel 1860 through which is sucked the hot combusted gas generated by the burner. Suction is applied from the intake 1853 to a blower 1854, and a side inlet 1852 opens to a supply of ambient dry air but controlled as by damper 1851, is connected to mix such ambient air with the hot gases sucked through re-radiator 1860.

Blower 1854 propels through outlet 1855 the gases drawn through inlet 1853 and pushes those propelled gases at a pressure of at least 10 psig through a discharge slot 1847 shown as formed by a sheet metal box 1856. The slot 1847 should be about 3 to about 6 millimeters wide and should extend across the entire width of web 1891, so that it delivers a thin air curtain jet of recirculated gas directed at a speed of at least about 10 feet per second along the web surface being irradiated.

The jet should not be discharged more than about 5 millimeters from the web surface, so that the outer wall 1848 of the metal forming the jet should be quite thin—not over about 1 millimeter. This permits that wall to be spaced a few millimeters from the web. The jet can be directed parallel to the web, or it can be directed toward the web by up to about 5 degrees.

In order to reduce the burbling caused by the venturi effect of the jet, wall 1848 can have a number of small perforations that permit gas to flow at low speed from the interior of the jet forming box into the space 1846 between the web and wall 1848.

Also an additional gas discharge 1845 from blower 1854 can be directed at relatively low speed toward the web from a distance of 1 to 3 millimeters. This causes gas streams to flow both upward and downward along the web, as shown by arrows 1848, 1849. Stream 1848 also helps reduce the mixing effect of the venturi formed by jet 1847. Jet 1847 can alternatively be angled a bit so that it is directed toward the web 1891, rather than parallel to it. Thus box 1856 can be spaced about 5 to about 7 centimeters from the web, with its slot directed about 20° from parallel so that it gradually reaches the web and continues along the web is an essentially laminar flow.

By making the distance from the jet discharge to the upper end of the irradiation zone not over about 50 centimeters, the jetted air curtain will accomplish two results. It will not only rapidly flush away the vapor laden gas layer formed at the web surface by the heating effect of the irradiation, but will also keep its curtain nature and not intermix to much with the combusted gases generated by the burner. The curtain can then be collected in an exhaust box 1859 at the far end of the irradiation zone, and discharged at a location where the vapor it picks up is not returned to the web.

The temperature of the air curtain gas should not be so high as to damage the web. Where the web is paper, that temperature should be not over about 400° F. Some webs made of resin fibers will be damaged if the jet temperature is above 250° F., but high temperature webs such as those made of kevlar can withstand 450° F. jets. The jet temperature is easily controlled by adjusting damper 1851 to mix more or less cold ambient air with the recirculating hot gases.

Burner 1842 is shown as an air-seal type burner with marginal hold-down flanges 1857 holding matrix 1843 in place. A non-air-seal type burner such as that of FIG. 3 can alternatively be used, so that no significant amount of metal is exposed to the combustion zone. Where metal is so exposed at the upper end of the burner, such metal can be covered as by extending panel 1860 downwardly to overlie the metal.

All of the 1838 equipment can be mounted on a single metal channel or plate 1858. Resilient separators as at 1882 can be inserted between adjacent metal structures that are at different temperatures in use, to reduce thermal stresses upon heat-up and cool-down.

Web 1891 can be traversed across the irradiation zone in an upward or downward or even sidewise direction. Several units 1838 can be used to treat a web, either in cascade as in FIG. 2 or in tandem to irradiate both web faces. The units can also be tilted away from the vertical.

Thus as shown in FIG. 16, a web can be threaded up and over a top roller 1888 and then down, to provide two runs 1890, 1892 against each of which an irradiating unit is installed. This triangular web runs uses only a single roller 1888 that is not in line with a main set of rollers 1894, 1896, and is therefore desirable. Such a triangular arrangement is also suitable as a modification for the construction of FIG. 7, or for other treatment applications.

The construction of FIG. 15 can be varied as by eliminating the sucking of the hot combusted gases through a porous re-radiator panel. Such a variation is partly illustrated in FIG. 17. Here a web of wet paper 1990 or the like is irradiated by an irradiation unit 1938 that includes a gas-fired infra-red generator 1942 and a re-radiator panel, as well as means for sweeping a stream of gas from a jet discharge 1947 to an outlet 1988. Generator 1942 can be constructed like generator 1842 in FIG. 15, and panel 1960 can be made of porous or non-porous ceramic fiber construction.

The gases emerging from outlet 1988 can be recycled by blowing them through jet 1947, preferably after they are cooled somewhat as by mixing with ambient air. Panel 1960 has its irradiating surface facing web 1990 heated by the hot combusted burner gases that moves past that surface toward the outlet 1988.

The ceramic fiber matrixes for the various burner constructions of the present invention are generally long enough to span the entire width of a web that is to be irradiated, even if that web is 200 inches wide in the cross-machine direction. For web width over about 78 inches, the matrixes are preferably pieced together as described in U.S. Pat. No. 4,224,018.

In the machine direction, the matrixes have generally been relatively short. Thus in an air-seal burner as illustrated in FIG. 15 the matrix might only have 11 inches of its machine-direction span heated to incandescence. The matrix itself could measure a total of about 14 inches in the machine direction, but 3 of those inches are covered by hold-down angles or are devoted to air-seal air discharge. The burners of the present invention preferably provide incandescent spans as large as 15 inches in the machine direction. Where a 15 inch radiant span is provided in a burner such as that of FIG. 15, the overall span of the matrix could be 3 inches greater.

Figure 24:
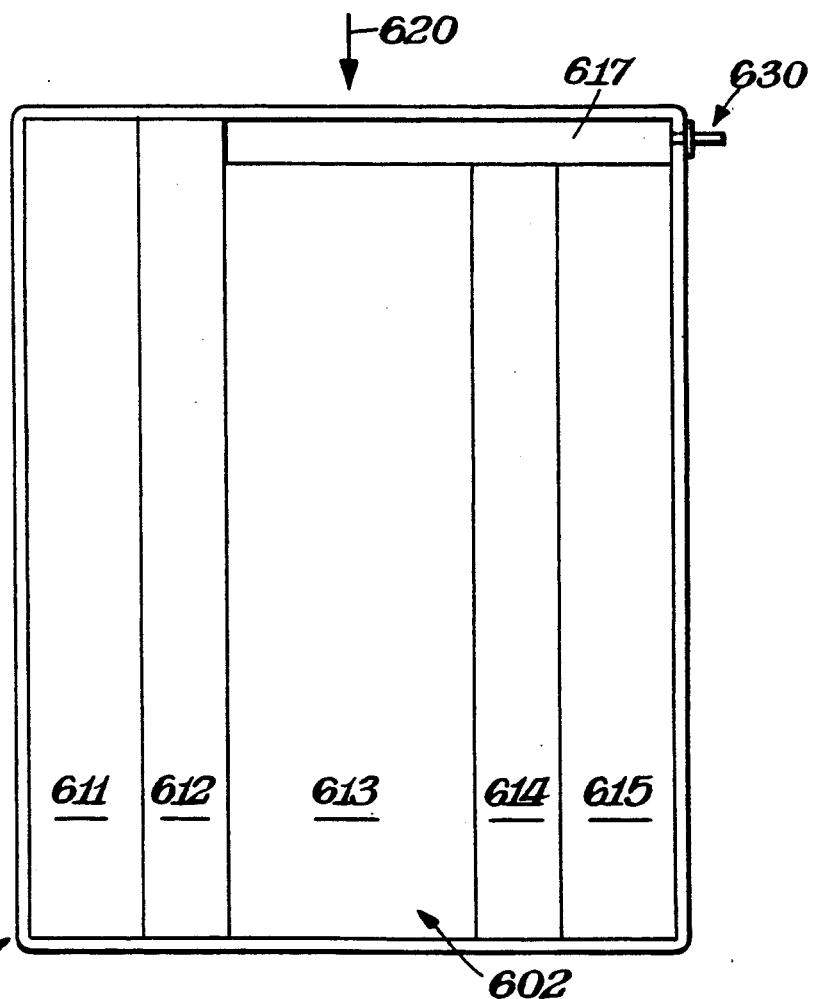
FIG. 24 illustrates a different burner combination of the present invention.

About 1½ to 2 inches of the matrix's machine direction span can be devoted to a pilot compartment as illustrated in FIG. 24, infra. Thus in an arrangement of the type illustrated in FIG. 15 each burner can have a two-inch wide pilot combustion compartment extending across the entire cross-machine direction of the burner. A flame monitor can then be mounted at one end of the burner in alignment with the pilot compartment and oriented to respond to incandescence or flame on the matrix portion covering the cross-machine center of the pilot compartment.

The pilot compartment is more conveniently ignited as by the electric ignition of FIG. 4, than an entire burner, and the monitor will then serve to make sure the pilot compartment is operating. In the event the monitor fails to show such operation, it automatically shuts down the entire burner, as a safety measure. However, so long as the pilot compartment operates, it can be controlled to always remain operating, whether the burner is turned up to its maximum output, or turned down or out. In such an operation the pilot compartment is arranged to be turned down to provide very little radiation, so that even though it remains operating when the balance of the burner is shut off, it will not ignite a paper web for example that may be stopped facing the operating compartment. When the burner is turned on after being turned off, the pilot compartment which can be kept on all the time will ignite the burner's combustion mixture.

To place a burner in operation, only the pilot compartment need by started, and since the pilot compartment is much smaller than the combustion mixture plenum, the start-up takes less time. Start-up also generally involves a discharge of excess combustion mixture, and such excess is much smaller for the pilot compartment than for the entire burner.

If desired, the pilot compartment can be continually maintained in operation at a very low level, whether the burner itself is turned up high or turned down low. Although this reduces the maximum radiation available from the burner, the burner controls are simplified and interruption delays reduced. Also burners are also never used at their maximum output, and for a burner with a 15 inch radiant length in the machine direction, a 1.5 inch pilot compartment length in that direction is very minor.

The foregoing modification of FIG. 15 can be further modified as shown in FIG. 18. Here, substrate 2000 being irradiated is not very porous paper, for example, and the irradiating structure 2002 is carried by an encircling frame 2004 the interior of which can be lined with thermal insulation. The frame is open at its top and bottom, and holds a set of four burners 2011, 2012, 2013 and 2014 as well as a set of porous re-radiator panels 2021, 2022, 2023 and 2024. The burners and panels are offset from each other so that burners do not fire at each other in the event the substrate is not in place. Piping supplies combustion mixture and the like, and draws off combustion products through the reradiator panels, but is not illustrated.

In FIG. 18 the substrate is carried through the frame from left to right, through an entrance slot 2008 and an exit slot 2009. Just before it reaches the exit slot it is subjected to gas jet curtains from jets 2031, 2032 which are directed toward the substrate and about 40 to 50 degrees upstream. This jet curtain treatment keeps the gases in the irradiation zone 2019 from escaping in any significant amounts through exit slot 2009, and can also be the jet action help suck ambient air through that slot from outside frame 2004.

The top and bottom of frame 2004 is completely filled by the burners and re-radiator panels so that the only other opening into the irradiation zone is the substrate receiving slot 2008. Vapors including solvent vapors are accordingly kept from leaking out, and any such solvent can then be recovered or burned. In order to permit simple threading of the substrate through the frame, one or both sidewalls of the frame can have side slots about 2 to 4 inches high that extend along those sidewalls and are closed as by hinged doors. Through their side slots a person's fingers can be inserted to grip and move the substrate through from entrance slot 2008 to exit slot 2009.

The apparatus of FIG. 18 is also equipped with fire-extinguishing means to prevent the spreading of a fire on the substrate. A substrate such as paper may ignite and start to rapidly burn, as for example, when a side edge tears and pushes itself against the incandescent face of a burner or when a paper substrate moving through the frame 2004 slows down to a speed low enough to permit it to be ignited by the intense irradiation. Such a slow-down is particularly apt to occur when the substrate is a web of printed paper supplied from a high-speed rotary printing press or the like, for quick drying. Problems frequently arise with the press to make slowdown necessary, and it is then much more responsive to operate the fire extinguishing of FIG. 18 rather than pull all the burners away from the paper, as suggested by the prior art.

The fire extinguisher of FIG. 18 is a pair of snuffer bars 2041, 2042 of ceramic fiber or metal held by air cylinders 2046 connected to be triggered by a flame detector to push the snuffer bars against opposite faces of the substrate to thus snuff out any fire on the moving or stationary substrate. It may be desirable to locate the snuffing zone well downstream of exit slot 2009 to make such a detected fire does not get past the snuffing zone before the snuffer is operated.

A similar fire extinguisher can be provided near the substrate entrance slot 2008 to keep fires from travelling upstream on the substrate.

Fire extinguishing action is improved by having jets 2031, 2032 arranged to jet gas at a velocity high enough to blow out most flames, and particularly where the gas so jetted contains little or no oxygen. Such gas can be obtained from the gas withdrawn through the re-radiator panels, particularly when the burners are operated with a combustion mixture at or slightly richer than stoichiometric, and when so-called air-seal burners are used, the air for the air seals is replaced by or diluted with recycled combusted gas.

The burner matrixes are preferably impregnated with about 1% dimethylsilicone water-proofing oil, as described in Ser. No. 592,793, to make them resistant to the action of streams of water which may reach them when they are not in use and equipment is being hosed down. Also, the matrixes can be made to operate with more uniform incandescence if they are molded from fiber slurries containing at least about 0.2% dispersing agent such as the non-ionic alkylphenylpolyethoxyethanols. The use of a fiber binder such as rubber which cures to a hydrophobic product is also helpful.

Many gases evolved from irradiated substrates are combustible and can be made to burn on surfaces through which they are sucked as at 1814 in FIG. 15, to further increase the heating and curing effectiveness of the apparatus of the present invention, and at the same time reduce its environmental impact. A coating of platinum black particles can be applied to the exposed surface of 414, for example, as by spraying it with a solution of chlorplatinic acid and then heating the sprayed surface to a temperature that decomposes the chlorplatinic acid. Catalyst weight of as much as one to two grams per square foot of gross surface (as measured with a ruler) can be used. Other platinum family metals and oxidation catalysts can be substituted for the platinum. Cerium oxide and the oxide of other rare earth metals are examples of good oxidation catalysts.

The gas-fired burners of the present invention can have matrixes of varying sizes and shapes. Although for some purposes radiant faces can be only about 25 centimeters by 25 centimeters in size, the most desirable uses for gas-fired irradiators is in the larger sizes. For spanning movable webs as much as 5 meters wide, it has been previously found desirable to have a long burner with a matrix correspondingly up to about 5 meters long in the cross-machine direction, but only about 30 to 35 centimeters in the machine direction. Making a matrix much larger in the machine direction has not been desirable because the matrix is not sufficiently rigid. Thus, a conventional flat matrix board stiffened only by binders and 2.5 to 3 centimeters thick will, under the pressure of the combustion gases in the mixture plenum, deflect outward by as much as 5 or more millimeters when the matrix length and width are 50 centimeters by 100 centimeters. Such deflection is experienced whether the matrix is in an air-seal burner, or in a non-air seal burner.

The matrixes do not have much tensile or burating strength, and can be weakened by such bellying out. In addition, the deflection adversely affects the irradiation of substrates that are located only about 3 to 5 centimeters away.

According to the present invention such deflection is securely minimized or completely prevented by the construction of FIGS. 19 through 21. Here, a burner 700 has a burner body 702 to which matrix 704 is clamped by a series of clamping angles 705 secured as by bolts 708 to the burner body.

That body has a shallow sheet metal box 712 to the periphery of which is spot-welded channels 714 that have unequal arms 716, 718 that define an air-seal plenum with a discharge slot 720 extending around the entire periphery of box 712. A tough-shaped stiffener-diffuser 722 is also welded to the box 712 by the same spot welds that secure the peripheral channels 714. A series of apertures 722 in the sides of trough 720 establish passage between the inlet combustion mixture plenum section 726 above the trough, and the outlet combustion mixture plenum section 728 between the trough and the matrix 704.

As more clearly shown in FIGS. 20 and 21, the matrix has its internal surface 730 provided with a groove 732 about 7 to about 10 millimeters deep and about 3 to 4 millimeters wide. A sheet metal strip 734 has one edge inserted in the groove 732 and anchored there with adhesive 736. The strip is preferably about 1.5 millimeters thick, leaving spaces about 1 millimeter wide on each side receiving the adhesive. Through the thickness of strip 734 a series of apertures 734 are provided to provide an adhesive bridge 740 between the adhesive on the opposite sides of the strip. These apertures are preferably about 4 to about 6 millimeters wide and high, and total about 100 square millimeters per decimeter of strip length.

Strip 734 is removably secured to the trough floor 720 as by the snap fastening 744, or the similar fastenings of Ser. No. 509,161.

As more fully shown in FIG. 20, fastening 744 consists of spring metal rounded latches 746, 748 secured to trough floor 720, that coact with latching apertures 750 in strip 734. Those apertures 750 can be made identical to the bridging apertures 738 so that the strip is symmetrical. After the strip is securely bonded in the matrix, the strip-carrying matrix can then be pushed into place, the free edge of the strip forcing its way between the spring latches, and thus latches itself in place.

The strip can also be pulled out of latching engagement by pulling out the matrix. The latches are arranged to require for disengagement a pulling force substantially greater than the bellying forces developed by the pressure in the combustion mixture plenum. About 25 pounds of disengagement force is adequate for matrixes about 50 centimeters by 100 centimeters. The strip 734 can extend across the entire span of the matrix, or can only be restricted to the center 10 or 15 centimeters of the matrix span.

All of the foregoing dimensions can be varied plus or minus 20% according to the present invention.

The most effective adhesives are elastomeric or rubbery inasmuch as they more securely adhere to the flimsy, flexible fibers of the matrix. Silicone adhesives are preferred because they are not only elastomeric when fully cured, but they are also highly resistant to the heat generated by the burner. Room temperature self-vulcanizing silicone adhesives are very effective, but silicone adhesives that need heat and/or chemical treatment for curing, can also be used. Stainless steels and polished metals might not adhere too well to silicone adhesives, so that it is preferred to make strip 734 of unpolished plain or cold rolled steel. The strip can also be roughened with coarse abrasive.

Groove 732 can be cut into a finished matrix as by means of a circular saw, or it can be molded in as by providing a corresponding insert in a mold in which a slurry of the matrix-forming materials is placed and then molded.

The use of an anchoring strip such as at 734 to help restrain the matrix against bellying out is particularly desirable for matrixes that are both long and wide, as for example, at least about 65 centimeters wide and about 65 centimeters long. The thicker the matrix, the more resistant it is to bellying out but the greater its resistance to gas flow, and thus the greater the bellying force. A matrix as thick as 28 to 32 millimeters but with a flow resistance of 9 centimeters of water column needs less restraint. On the other hand, matrixes having the more usual thicknesses of 22 to 27 millimeters with 9 centimeters of water column resistance can advantageously be provided with restraining strips when they are only about 60 centimeters wide and 60 centimeters long. Matrixes containing powdered silicon carbide, as described in U.S. Pat. No. 4,500,283 are of this type.

The restraining strips are particularly useful when they are also used as plenum partitions.

For such use, the strips are not perforated and can be permanently secured as by welding directly to the back wall of a burner body. To insure a gas-tight mounting against that back wall, the mounting site can be coated with sealer such as silicone cement.

It is helpful to have such restrainer-partition strips penetrate at least about 6 to 8 millimeters into the back of the matrix when they are fitted in a location away from a matrix joint. Shallower penetration in a non-joint location permits significant diffusion of fuel gas through the matrix from one side of the partition to the other, when the plenum compartment on one side of the partition is not supplied with fuel gas. Such diffusion can also be reduced by supplying to the compartment not containing fuel gas, air at a pressure somewhat greater than the pressure in the opposite compartment.

The foregoing restraining strips can be used whether the burner is fitted with an air seal plenum around its edges or whether, ad in U.S. Pat. No. 4,416,618, it has no air seal. An air-seal burner can additionally or alternatively have its air seal partition, such as the end walls of trough 720 of FIG. 19, increased in height so they penetrate about 6 to 8 millimeters into a groove provided in the undersurface of matrix 50 and there cemented into place. This reduces changes in the width of the air-seal on the outer surface of the matrix when the pressures in the air-seal and combustion mixture plenums change.

When a burner is not provided with an air seal, the matrix is preferably cemented to the side walls of the burner body and those side walls arranged to conduct away heat fast enough to keep the cement from being significantly damaged by the high temperature of the matrix when it is firing. To this end, the burner body can be an iron or aluminum casting having side walls thicker, preferably at least about 50% thicker, than the back wall. Thus, the back wall need only be about 1.5 millimeters thick, but the side wall need only be at least about 2.5 millimeters thick when of aluminum, and over 3 millimeters thick when of iron.

By having the matrix project a little beyond the outer lips of the burner's side walls, and covering the thus-exposed projecting side faces of the matrix to prevent or inhibit burning of combustion mixture there, the side walls can be reduced in thickness. This is shown in FIG. 22.

Figure 22:
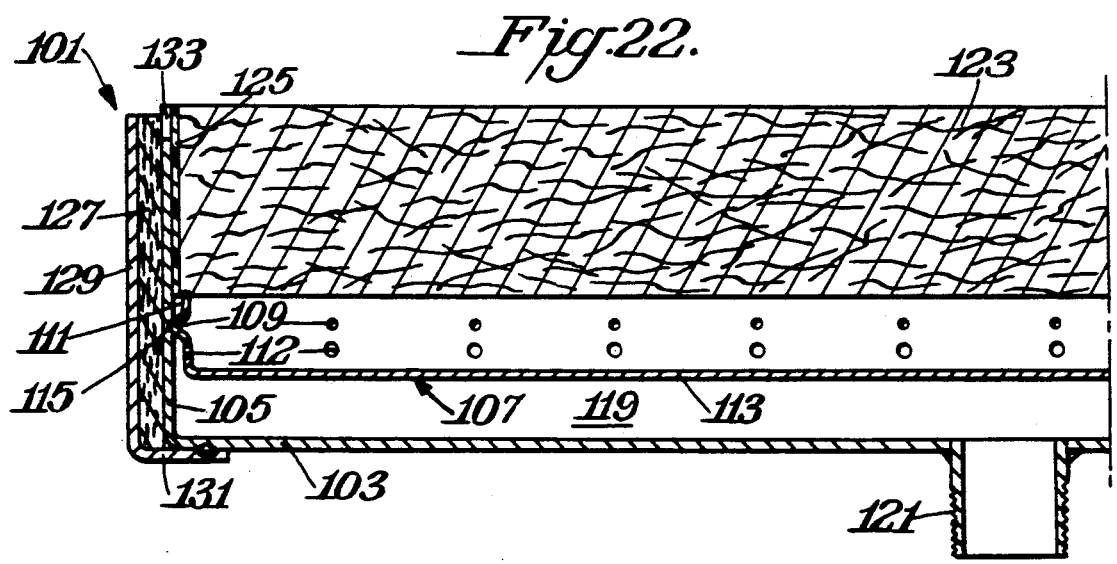
FIG. 22 is a sectional view of a burner such as that of FIG. 15, but further modified.

The burner of FIG. 22 has a burner body 101 in the shape of a shallow rectangular open-topped box cast, drawn or fabricated preferably of iron or aluminum, with a floor or back 103 and four side walls 105. Just above floor 103 a cup-shaped baffle 107 is spot-welded to the side walls 105. The welding is between a body side wall and a series of bulges 109 projecting outwardly from side walls 111 on the baffle 107. The baffle can initially be made with perfectly flat side walls, and of such sizes as to fit within burner body 101 with a relatively small clearance, e.g., 3 to 7 millimeters, between the baffle side walls and the burner body side walls. The bulges are then pressed outwardly from the baffle side walls so as to span the above-mentioned clearance. The thus-completed baffle is now inserted into the burner body and spot-welded as shown at 115, at some or all of the bulges. The floor 113 of the baffle is preferably spaced about 6 to about 12 millimeters above the floor 103 of the burner body.

Perforations as at 112 can be punched through baffle side walls or through the outermost portions of baffle floor 113 to increase the flow of gaseous combustion mixture past the baffle. The mixture is supplied to the plenum chamber 119 below the baffle, from an inlet nipple 121 which can be cast or drawn with the burner body, or welded to the burner floor around an opening punched through it.

A ceramic fiber matrix 123 is fitted snugly into the burner body mouth and preferably rests on the upper edges of the baffle side walls. As in U.S. Pat. No. 4,416,618, the edge faces of matrix 123 are covered with a thin layer 125 of adhesive such as a silicone cement or a polysulfone cement which stands up at temperatures as high as 200° C. to 240° C. The dimensions are arranged so the matrix extends upwardly about 2 to 4 millimeters beyond the top edges of the body side walls.

The body side walls are wrapped with thermal insulation 127 which need only be about 6 to about 10 millimeters thick and held in place as by a sheet metal or expanded metal or metal screen retaining walls 129 having a mounting flange 131 extending under and welded to the body floor 103. The space 133 immediately adjacent the projecting edges of the matrix is preferably filled with strips of high-density fibrous insulation to block or strongly impede the passage of gas from the top edges of the matrix.

When the burner of FIG. 22 is operated, the outer matrix surface is heated to incandescence and the adhesive 125 has its outermost millimeter or two subjected to sufficient heat to damage or destroy its adhesive character. However, the burner still operates very efficiently with little or no flame production beyond the matrix edges, particularly when it is firing face down.

When firing face up the insulation 127 and retaining walls 129 are not needed. However, the fibrous high-density filler in space 133 can be retained and held in place with an encircling strip of metal screening or the like.

The matrix is preferably about 20 to 26 millimeters thick, and the cup-shaped baffle sheet is about 15 to about 20 millimeters deep. Where the insulation 127 is not used, the burner body side walls 105 are preferably about 2 to about 3 millimeters thick when made of iron or cold-rolled 1010 steel, although they can be a little thinner if made of aluminum or if the burner is firing face up and there is no possibility of the burner sides being exposed to high ambient temperatures. Where the insulation 127 is used, the side walls 105 can be about 1.5 millimeters thick.

A tap can be provided for plenum compartment 119 so the pressure of the combustion mixture in it can be monitored.

Gas-fired ceramic-faced burners, whether the ceramic be in fibrous form or in the form of a porous plate, are quite sensitive to the stoichiometry of the combustion mixture burner in them. Small departures either in the rich or lean direction significantly reduce the temperature of the incandescent radiant surface. Any untoward change in the mixture, as for example, by reason by fluctuations in the mixing of air with the fuel gas or in the composition of the fuel gas, or indeed in the moisture content of either the air or the gas, will accordingly change the efficiency with which the burner operates. Prior art developments aimed at overcoming these difficulties have provided control equipment that is too expensive and/or not sufficiently effective.

Figure 23:
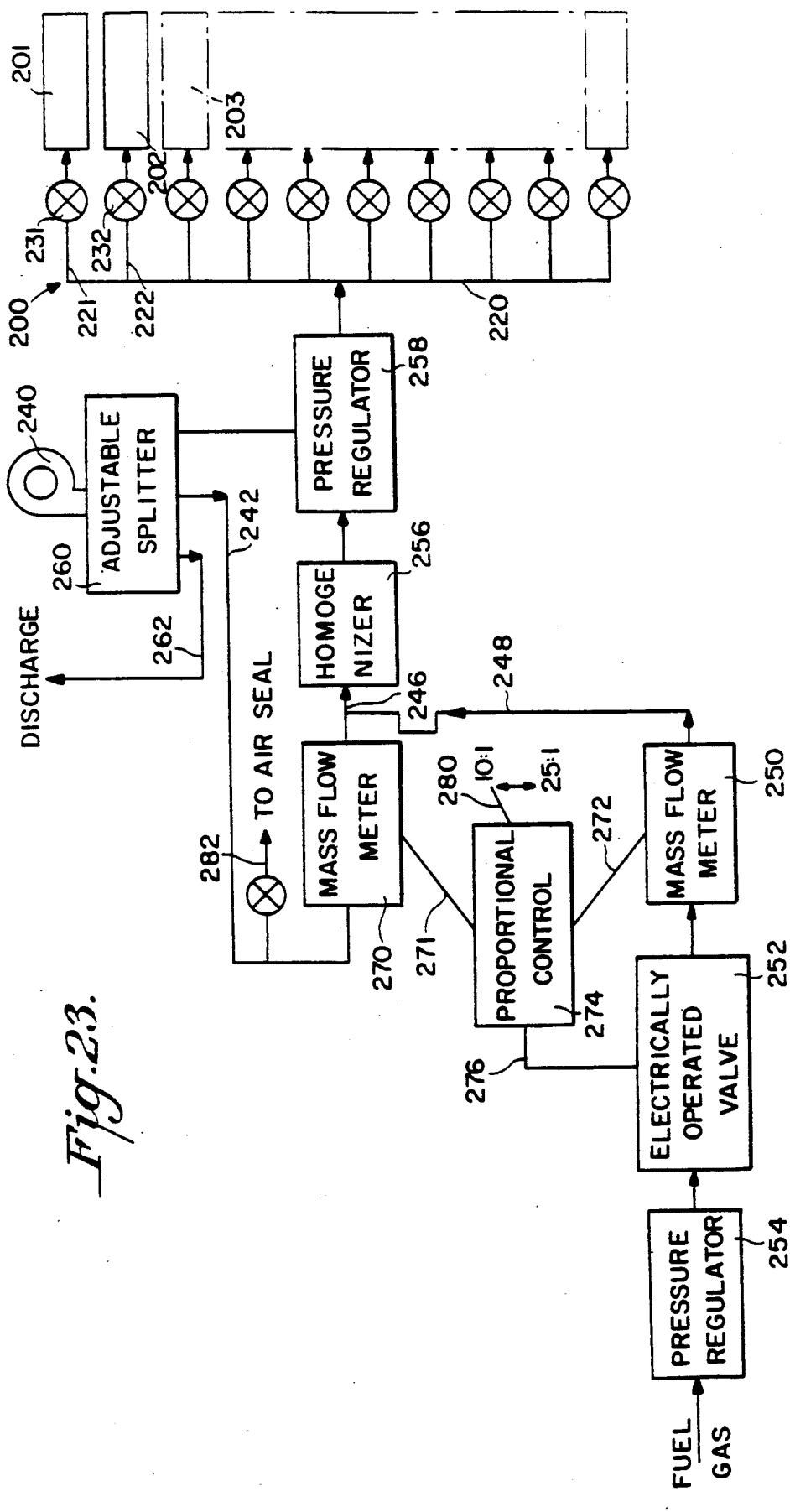
FIG. 23 is a schematic illustration of a burner control technique pursuant to the present invention.

FIG. 23 shows an improved technique for this purpose. Here, a bank 200 of burners 201, 202 etc. are supplied with combustion mixture through a trunk line 220 leading to individual branches 221, 222, etc. for the individual burners, any or all of which can be turned on and off, and modulated by individual combustion mixture flow control valves 231, 232, etc.

A blower 240 supplies the air for the burners. That air is delivered through conduit 242 and through a mass flow meter 244, to a mixer 246 to which fuel gas is also supplied through conduit 248 having a second mass flow meter 250 and an electrically operated control valve 252. Fuel gas can be delivered to valve 252 from a source of fuel gas under pressure, and a pressure regulator 254 can be used to control the pressure of the fuel gas delivered to valve 252. That pressure can be about ¼ to about 5 centimeters of water column greater than the pressure in mixer 246.

The mixture of air and fuel gas formed in mixer 246, which can be merely by a T- or Y-pipe connection, is preferably fed to trunk 220 through a homogenizer 256 and a pressure regulator 258. Regulator 258 is preferably adjusted so that the pressure in the combustion mixture trunk line 220 is about that at which a burner operates well. Where the burner is of the felted ceramic fiber type and the felted ceramic mat is about 25 millimeters thick, a suitable combustion mixture pressure in trunk 220 is about 30 centimeters of water column. The mat felting can provide different degrees of porosity and the pressure can be adjusted to provide the desired maximum flow of combustion mixture—generally about 3 cubic meters per minute per square meter of mat surface. Ceramic disk burners and metal mesh burners can be similarly controlled.

To enable the burning of any or all the burners as needed, for example, to operate a profiled paper drier as in FIGS. 16A or 16C or U.S. Pat. No. 4,604,054, using an inexpensive blower 240 that does not have to withstand maximum pressure when all burners are off, the pressure regulator 258 can be connected to operate adjustable splitter 260 which opens and closes the flow of air through a vent conduit 262, inversely to the closing and opening of the flow of air through conduit 242. The regulator can, for example, operate a pressure-responsive diaphragm that carries two needle valves, one connected to open more and more to the vent line 262 as the regulated mixture flow decreases, and the other to close the flow to line 242 as the regulated mixture flow decreases. In such arrangement, the blower will blow all its output air out vent line 262 when all the burners are shut off, and blow essentially all its output air to the burners when all burners are burning.

In line 242 leading the blown air to the mixer 246, there is a mass flow meter 270 which measure the rate of flow of the air to the mixer. That flow rate is coordinated with flow rate of the fuel gas through line 248, to provide mixer 246 with an essentially stoichiometric combustion mixture. Thus, the mass flow meters, which can be of the type shown in U.S. Pat. No. 4,487,062, can provide separate electrical outputs 271 and 272 to a proportion control 274 which has an output 276 that operates fuel gas valve 252. The proportion control is arranged to open or close valve 252 so as to make the gas flow in the desired proportion with respect to the air flow to the burners. For certain fuel gases such as propane, the proportion by weight is about 25 parts of air to one part of fuel gas. On the other hand, for fuel gases such as methane or natural gas, the proportion is about 10 parts of air to one part of the fuel gas. A selector switch as shown at 280 can be provided to select the desired proportion. Any logic circuit, such as those of U.S. Pat. No. 4,607,343 and the art of record in that patent, can be used to divide the 271 output by the 272 output, and deliver through line 276 error signals that operate fuel gas adjusting valve 252 to correct the resulting quotient and bring it to the desired proportion. Error correcting arrangements of this type are shown, for example, at pages 369 through 377 of Introduction to Industrial Electronics by R. Ralph Benedict, published 1959 by Prentice-Hall, Inc., Englewood Cliffs, N.J.

The combustion of FIG. 23 thus provides a relatively simple control technique for operating any, all or none of a large group of burners with relatively high efficiency. Where the burners contain air seals, a separate take-off 282 can be provided upstream of mass flow meter 270, to direct some of the blown air to those air seals. A control valve is take-off 282 can be used to open the air-seal flow and even to modulate the air-seal flow, if desired. Such modulation can be made automatic by providing an extra proportion control supplied by mass flow meter output 271 and connected to electrically operate the valve in line 282 so as to provide air seal air at the desired proportion to combustion mixture air.

Instead of operating the mixture proportion control from mass flow meters, it can be operated with other devices such as by measuring the infra-red absorption or thermal conductivity of the combustion mixture before or after it is combusted. The fuel gases such as hydrocarbons provide easily measured values before combustion, as well as large carbon dioxide values and other easily measured values such as carbon monoxide and low oxygen, after combustion. Proportional gas-air supplies based on a pair of inter-connected floating cone valves, such as those available from Eclipse, Inc., Rockford, Ill., under the designation "Consta-Mix" can also be used, although they need frequent adjusting calibrations. The foregoing techniques do not require the arithmetical dividing operation of control 274.

The control from regulator 258 to the adjustable splitter 260 can be made electrical rather than mechanical, as described. No venting of the air blower is needed, but the venting permits the use of a blower that does not have to be strong enough structurally to withstand the internal pressure of the unvented pressurized air within it when the blower is operating with all burners shut down, for example.

In some cases, a separate outlet 282 can be used to provide a separate stream of pressurized air, to blow through the air seals of air seal burners, for instance. In such a combination, it is possible to keep the air seal air moving through one or more of the burners even when such burners are not burning, in order to reduce the pressure build-up within the blower when all burners are off and no other burner venting is used.

The control system should have the desired safeguards such as blow-out reliefs in the event of the ignition of the combustion mixture in the trunk and/or burner lines, as well as automatic fuel shut-off when no burner ignition is sensed.

In some cases, as where substrates of varying width are to be irradiated, an assembly of burners or of separately fired burner segments (see U.S. Pat. No. 4,378,207) is arranged in a generally parallel array the total width of which can be as great as 1 to 5 meters. In such an assembly, it can be quite awkward to control the ignition of the burners or burner segments in the interior of the array.

FIG. 24 shows such an array 600, looking at its radiating face 602. That face is divided into a parallel array of five irradiating zones 611, 612, 613, 614 and 615, and also contains a pilot zone 617. Each of these zones can be provided by a separate burner, but they can alternatively be provided by partitioning of one or more large burners, as described in U.S. Pat. No. 4,378,207, or by the use of gas-tight matrix partitions in the manner described hereinabove. Where such matrix partitions do not extend to the burner face, the array can be connected so that a stream of air is passed through any compartment which is not irradiating but is adjacent one that is irradiating. Such stream will help keep combustion mixture in the irradiating zone from leaking through the matrix to the zone that is not irradiating.

Zones 611 through 615 are elongated in the machine direction represented by arrow 620. That is the direction in which substrates to be irradiated are carried under the zones, as by a conveyor belt or the like. Each of these five zones can be provided by a single burner, or a single burner segment, but they can alternatively be provided by a series of two or more shorter burners or burner segments.

The assembly 600 can be used for drying the output of printing machines, or as a pre-drier in a textile processing operation, or for profile drying of paper as it is manufactured in a paper-making machine, or for any other variable width irradiation. When the substrate, such as printed papers, are only approximately as wide as zone 615, then the assembly 600 is arranged so those papers are carried only through that zone, the remaining parallel zones being then turned off. When the printed papers are wider than zone 613, then zone 612 and/or 614 can be fired along with zone 613, and for the widest substrates all five parallel zones can be fired, and thus any width can be used without having to change the structure of the assembly.

Zone 613 is arranged to be ignited by the operation of pilot zone 617, which in turn is ignited by igniter 630 which can be a gas flame supply or an electric sparking unit. Igniter 630 is mounted at a side edge of assembly 600, so that it is conveniently positioned and can be readily maintained without having to reach into the interior. The combustion of the combustion mixture at the face of the pilot zone will readily ignite combustion mixture emerging from zone 613, even when these two zones are separated by air seals totalling several inches in width. This is particularly true when the burner assembly is operated facing downward.

Pilot zone 617 is shown as extending to zone 612, so that zone 612 can be readily ignited when zone 613 is not in operation. If desired, the pilot zone can be similarly extended to zone 611. Where no unilateral operation of zone 612 or 611 is needed, the pilot zone can be shortened since it need not traverse the full width of zone 613. In the machine direction the pilot zone need only be about 2 to about 5 centimeters wide. It can be kept firing whenever substrates are being irradiated, and can be arranged so it turns down to a minimum firing condition but does not turn off when substrate irradiation is interrupted.

FIG. 25 shows an igniter sub-assembly 630 which is particularly desirable. Here, a metal mounting channel 632 is fitted with a block of thermal insulation 634 held in place as by washer 636 clamped by rivet 638 against the web of the channel.

Welded through an opening in the channel web is a flame tube 640 having a combustion mixture inlet 642 and inlet nozzle 644 at one end. Adjacent that nozzle the electrodes 646 of a spark plug 648 are fitted to ignite the incoming combustion mixture.

The other end of the flame tube has one side partially cut away to provide a side window 650 for receiving the end 652 of a flame rod 654 held there by a suitable mounting within a ceramic tube 656. Tube 656 is clamped in a fitting welded through a separate opening in channel 632, and an electrical connector 658 is fitted onto the outer end of the flame rod.

By having the flame rod end 652 within about one centimeter from this wall of the flame tube and arranged so that about 3 to 6 millimeters of the rod end 652 is rendered incandescent by the burning combustion mixture, very dependable flame sensing is obtained. The flame rod end should be about 2 to 3 millimeters thick.

The thermal insulation 634 also improves the operation by helping keep the outer metal portions from getting too hot. Mounting the sub-assembly 630 as by screws to a sheet metal extension on the frame of a burner with the insulation 634 between that extension and the sub-assembly is all that is needed. The thickness of the insulation can be from about 4 to about 15 millimeters. Spark plug 648 can be tilted so as not to excessively obstruct access to the rivet and to mounting screws.

Figure 26:
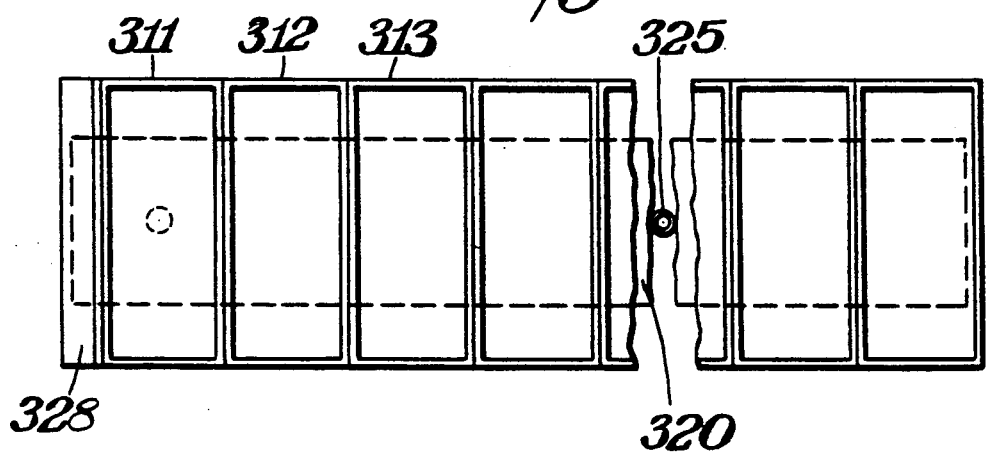
FIG. 26 is a face view, partly broken away, of another combination of burners according to the present invention.

FIG. 26 illustrates a burner assembly of particular usefulness for heat-treating very wide substrates as they are manufactured. Thus, papermaking machines are being manufactured wider and wider, and currently some are 25 to 30 feet wide. Widening those machines appears to increase their cost-effectiveness.

Although individual infra-red generators can be made as long as 30 feet in order to span such machine widths, the use of a single matrix having the necessary length is quite awkward. A ceramic fiber matrix that long is quite fragile and easily damaged in handling. Moreover, papermaking machines are, as noted, usually serviced with high pressure streams of water that are used to remove broke and the like, as well as to clean working surfaces. Directing such a high pressure stream against a ceramic fiber matrix is likely to ruin the matrix even if the stream contacts a small portion of the matrix for only a second or two. Where a single matrix is used, the entire matrix is then in need of replacement.

The construction of FIG. 26 contains a number of independent burners 311, 312, 313, etc. aligned on and independently secured onto a relatively rigid support such as channel 320, so as to span the 25 or 30 feet needed. Each burner is of the non-airseal type having a hollow open-faced rectangular burner body 322 of metal plate as disclosed in U.S. Pat. No. 4,416,618, with a ceramic fiber matrix 324 that fills the open body face. Each burner is accordingly very simple and inexpensive, needing only a combustion mixture inlet 325, and a baffle of some sort to help distribute the combustion mixture over the entire matrix. Such a burner can accordingly be simply replaced if its matrix is damaged. The burners are separately secured to channel 320 so that any of them can be readily replaced without affecting the remaining burners. To this end, all burners can be identical in size and shape, with pre-aligned mounting studs or sockets, and a pre-aligned combustion mixture inlet.

The piping to which that inlet is connected can be of the flexible type to compensate for unforeseen minor variations in the tilt and/or location of the inlet.

Adjacent burners should have their matrixes not over about ½ inch apart, to avoid the creation of a significant non-uniformity of radiation intensity across the row of burners. This is readily accomplished with burners having aluminum sidewalls, each about ⅛ to about 3/16 inch thick. The inevitable gap between adjacent sidewalls is best filled with resilient material even though that gap is only about ⅛ inch wide or less. Such filling keeps to a minimum the flow through that gap of hot combusted gases that can cause localized overheating.

Figure 27:
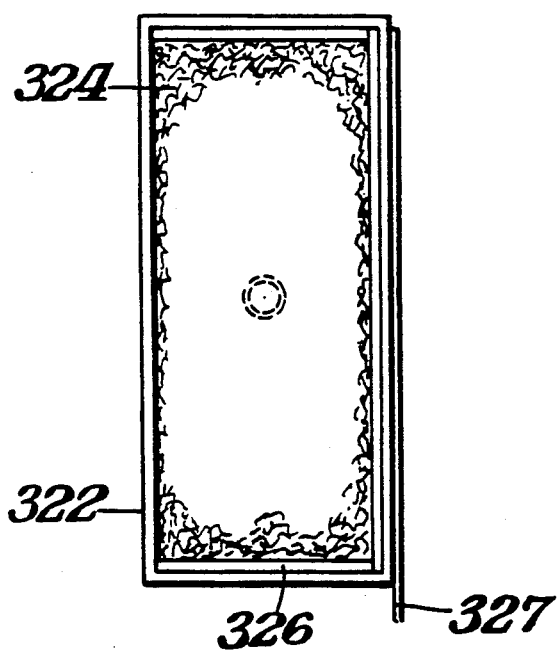
FIG 27 is a face view of a single burner of the combination of FIG. 26.

In the interest of simplicity each burner can have three of its four sidewalls pre-coated with a thin layer of thermal insulation 326, such as felted ceramic fiber, as shown in FIG. 27. That layer can be about 1/16 inch thick and somewhat compressible, adhered to the outside faces of the sidewalls with silicone or other adhesive that withstands temperatures as high as about 400 degrees F. When the burners are mounted, a thin stiff filler strip 327 of stainless steel or the like can be wedges between adjacent burner sidewalls or compress and seal the insulation layer in place. An end angle 328 can be used to hold an extra strip of insulation against an end burner.

Figure 28:
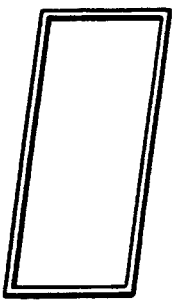
FIG. 28 is a face view of a modified single burner of the present invention.

If desired, the individual burners can have their inter-engaging sidewalls oriented along a line that is angularly offset from the machine direction. An angular offset that locates the upstream edge of the burner joints about one inch or more laterally of the downstream edge, as shown in FIG. 28, has the effect of diminishing the abruptness of any change in substrate radiation intensity caused by the gap between adjacent matrixes.

It will be noted that the angular offset can be provided by having the burners truly rectangular but tilted, or by having the burners slightly diamond-shaped.

It may also be desired to increase the radiation intensity as by pre-heating the incoming combustion mixture. An incoming combustion mixture heated to 150 degrees F. provides substantially higher radiation intensity than one which enters at 50 degrees F. The pre-heat can be applied to the incoming air, or to the incoming fuel gas, or to both. Fuel gases or combustion mixtures tend to become unstable when heated to temperatures as high as 200 degrees F., inasmuch as the burners have some of their parts operating very hot and in contact with incoming mixture.

The burners generate large quantities of hot combusted gases, and the incoming gases are conveniently heated by merely passing them through a conduit in contact with the combusted gases.

Increases in radiation intensity are also obtainable by enriching the oxygen content of the air used to make the combustion mixture. Thus, with the help of semi-permeable membranes through which oxygen or nitrogen is preferentially diffused, an enriched air having an oxygen content of 22% or more by volume is readily available. Typical membranes and arrangements are described in the following U.S. Pat. Nos.: 4,537,606, 4,745,334, 4,696,686, 4,664,681, 4,655,807, 4,542,010, 4,759,780, 4,781,733 and 4,174,955.

Drying the air also has an effect in increasing its oxygen content. Air dried to a dew point of not over about 30 degrees F., or better still not over about 25 degrees F., is desirable for this reason. In very cold weather, such air can be merely taken directly from the exterior ambient atmosphere, but in warmer weather the air should be subjected to an effective drying treatment as by a refrigeration treatment that condenses out excess moisture. Such refrigeration is conveniently applied from a heat-operated refrigerator supplied with the hot combusted gases generated by the burners.

Figure 29:
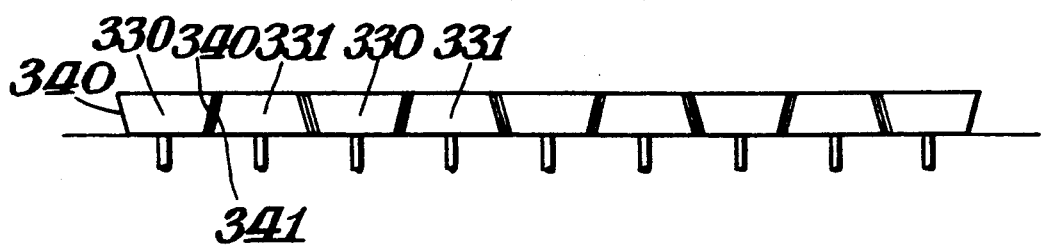
FIG. 29 is a side view of a modified burner combination of the present invention.

FIG. 29 shows a modification of the invention in which the burners are wedges against each other. Here the burners are of two types—330 and 331. The type 330 burners have their sidewalls 340 tapered inwardly, that is toward each other, as they extend back from the burner face. The degree of taper need be only about 5 to about 10 degrees inclination of a sidewall from the vertical. The type 331 burners have their sidewalls 341 tapered in the reverse direction so that the burners nest together.

Each of the 340 and 341 sidewalls carries a thin coating, not over about ⅛ inch thick, of compressible heat-resistant material such as a ceramic fiber layer, and when a type 330 burner has its back fastened to a support between two previously fastened type 331 burners, the act of fastening wedges the type 330 burner in place and compresses the respective coatings to provide the desired gas-tight junctions. Replacing a type 330 burner is accordingly very simply effected, and replacing a type 331 burner requires the additional shifting or removal of an adjacent type 331 burner.

Figure 30:
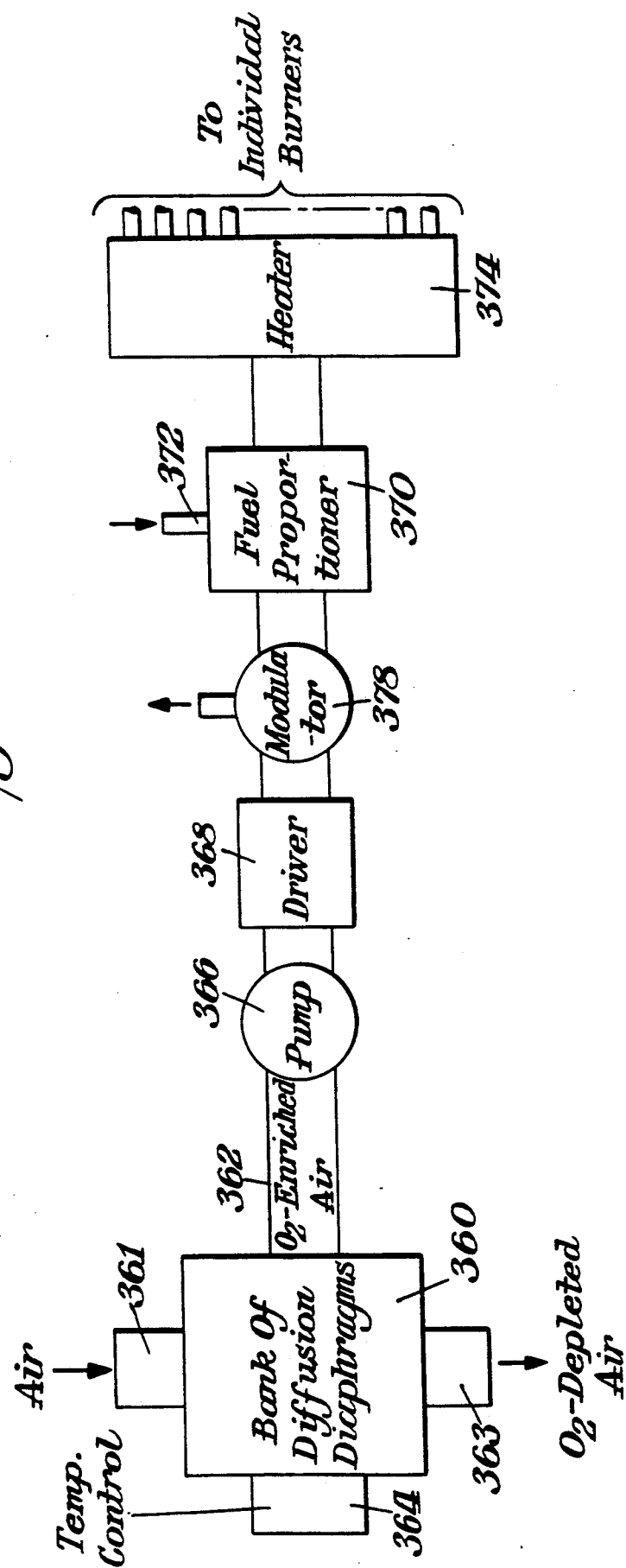
FIG. 30 is a floor diagram showing an improved fueling system for the burners of the present invention.

FIG. 30 shows a desirable combustion mixture supply system according to the present invention. An oxygen enricher 360, having a bank of selective diffusion membranes, as in the above-cited patents, has an air inlet 361, an outlet 362 for oxygen-enriched air, and an outlet 363 for oxygen-depleted air. A temperature control 364, preferably of the automatic type can be connected to help keep the selective diffusion temperature substantially constant.

The oxygen-enriched air is pumped by pump 366 through a drier 368 and then into a fuel proportioner such as a zero-pressure regulator 370 where fuel from inlet 372 is mixed with the air in predetermined proportion, generally stoiciometric. Between the drier and the proportioner, or between the drier and the pump, there is inserted a modulator 379 which opens a bleed outlet to the desired degree. In this way, the selective diffusion at 360 is not varied when the mixture flow is varied.

The fuel mixture from the proportioner 370 is then passed through heater 374 and from there to the individual burners. The heater can be omitted, but if used is preferably thermostatically controlled to keep the outgoing mixture streams at substantially constant temperatures regardless of the degree of modulation.

The oxygen enrichment is particularly suitable for use with burners that have matrixes which contain silicon carbide, as described in parent Ser. No. 831,795. Those matrixes tolerate well the higher outputs resulting from the enrichment. Indeed, for those matrixes the oxygen enrichment is preferably to at least about 30%. The resulting increase in power output enables the use of smaller burners.

Burners with matrixes containing silicon carbide generate a particularly low NOX content in their combusted gases. The NOX content can be further reduced by bleeding in a little ammonia into the combustion mixture. About 0.001% NH3 content in the combustion mixture will reduce the NOX output to the vanishing point. The presence of a little catalytic material like zirconia in the matrix or the matrix fibers is helpful in such NOX reduction.

Obviously, many modifications and variations of the present invention are possible in the light of the above teachings. It is, therefore, to be understood that within the scope of the appended claims the invention may be practiced otherwise than as specifically described.

What is claimed:

1. An aligned row of side-by-side gas-fired infra-red generators each with a generally rectangular radiant face and each in close engagement with the generators on each side of it, each generator having side walls about ⅛ inch thick with their radiant faces extending to those walls, a strip of engaging walls of adjacent generators to plug the spaces between generators against penetration of hot combustion gases generated by the generators, and the combustion mixture supply including a diffusion diaphragm and means for conducting a stream of air along one face of the diaphragm to cause some of the oxygen in that air to preferentially diffuse through the diaphragm, producing a stream of air enriched in oxygen.

2. An aligned row of side-by-side gas-fired infra-red generators each with a generally rectangular radiant face and each in close engagement with the generators on each side of it, each generator having side walls about ⅛ inch thick with their radiant faces extending to those walls, a strip of compressible material squeezed into place between the closely engaging walls of adjacent generators to plug the spaces between generators against penetration of hot combustion gases generated by the generators, and the closely engaging side walls of the generators being inclined away from perpendicularity with respect to their radiant faces, to provide a wedging action against the strips of compressible material.

3. A gas feeding combination for supplying a gaseous combustion mixture to a burner, the combination being characterized by enriching means connected to receive ambient air and to deliver oxygen enriched air, pressurizing means connected to receive the oxygen-enriched air and raise its pressure to above atmospheric, drying means connected to dry the oxygen-enriched air, fuel proportioning means connected to mix the dried oxygen-enriched air with a fuel gas is essentially stoichiometric proportions, and heating means connected to heat the mixture to a temperature above ambient.

4. A gas feeding combination for supplying a gaseous combustion mixture to a burner, the combination being characterized by enriching means connected to receive ambient air and to deliver oxygen enriched air, pressurizing means connected to receive the oxygen-enriched air and raise its pressure to above atmospheric, drying means connected to dry the oxygen-enriched air, fuel proportioning means connected to mix the dried oxygen-enriched air with a fuel gas in essentially stoichiometric proportions, and modulating means connected to vary the rate at which the oxygen-enriched air is delivered to the fuel proportioning means.

* * * * *